(12) United States Patent
Johnson et al.

(10) Patent No.: US 11,731,875 B2
(45) Date of Patent: Aug. 22, 2023

(54) METHODS FOR PRODUCTION OF GRAPHENE OXIDE

(71) Applicant: UNIVERSITY OF WYOMING, Laramie, WY (US)

(72) Inventors: Patrick Johnson, Laramie, WY (US); Ana Paula Martins Leandro, Laramie, WY (US)

(73) Assignee: UNIVERSITY OF WYOMING, Laramie, WY (US)

( * ) Notice: Subject to any disclaimer, the term of this patent is extended or adjusted under 35 U.S.C. 154(b) by 381 days.

(21) Appl. No.: 17/149,242

(22) Filed: Jan. 14, 2021

(65) Prior Publication Data

US 2021/0214231 A1   Jul. 15, 2021

Related U.S. Application Data

(60) Provisional application No. 62/961,550, filed on Jan. 15, 2020.

(51) Int. Cl.
*C01B 32/198* (2017.01)

(52) U.S. Cl.
CPC ................................ *C01B 32/198* (2017.08)

(58) Field of Classification Search
CPC ... C01B 32/198; C01B 32/182; C01B 32/184; C01B 32/186; C01B 32/188; C01B 32/19; C01B 32/192; C01B 32/194; C01B 32/196; C01B 2204/00; C01B 2204/02; C01B 2204/04; C01B 2204/06; C01B 2204/065; C01B 2204/20; C01B 2204/22; C01B 2204/24; C01B 2204/26; C01B 2204/28; C01B 2204/30; C01B 2204/32; C01B 32/20; C01B 32/205; C01B 32/21; C01B 32/215; C01B 32/22; C01B 32/225; C01B 32/23; Y02P 20/145
See application file for complete search history.

(56) References Cited

U.S. PATENT DOCUMENTS

2018/0282163 A1   10/2018  Tour et al.
2019/0194022 A1*   6/2019  Atkins ................. C01B 32/205

FOREIGN PATENT DOCUMENTS

CN          103922329 A        7/2014
WO      WO 2014179708 A1     11/2014
(Continued)

OTHER PUBLICATIONS

Jankovsky, et al., Concentration of Nitric Acid Strongly Influences Chemical Composition of Graphite Oxide, Chem. Eur. J. 2017; 23: 6432-6440 (Year: 2017).*

(Continued)

*Primary Examiner* — Daniel C. McCracken
(74) *Attorney, Agent, or Firm* — Leydig, Voit and Mayer, Ltd.

(57) ABSTRACT

Methods for producing graphene oxide products are disclosed. In one embodiment, a method of producing a graphene oxide product includes contacting a carbon-containing feedstock with an oxidizing composition comprising aqueous nitric acid, wherein the concentration of nitric acid is 50 to 63 wt %, to from a reactant slurry, in response to the contacting step, oxidizing the carbon-containing feedstock of the reactant slurry to form a graphite oxide slurry; and processing the graphite oxide slurry into a graphene oxide product.

30 Claims, 19 Drawing Sheets

(56) References Cited

FOREIGN PATENT DOCUMENTS

WO     WO 2016025051 A2     2/2016
WO     WO 2016053411 A1     4/2016

OTHER PUBLICATIONS

Tu, et al., Remarkable Conversion Between n- and p-Type Reduced Graphene Oxide on Varying the Thermal Annealing Temperature, Chem. Mater. 2015; 27: 7362-7369 (Year: 2015).*
Acik et al. (2010) "The Role of Intercalated Water in Multilayered Graphene Oxide," ACS Nano 4, 10, 5861-5868. doi:10.1021/nn101844t.
Antink et al. (2018) "Recent Progress in Porous Graphene and Reduced Graphene Oxide-Based Nanomaterials for Electrochemical Energy Storage Devices" Adv. Mater. Interfaces, 5, 1701212. doi.org/10.1002/admi.201701212.
Araújo et al. (2017) "Tuning the surface chemistry of graphene flakes: new strategies for selective oxidation," RSC Advances 7, 14290-14301. doi:10.1039/c6ra28868e.
Becerril et al. (2008) "Evaluation of Solution-Processed Reduced Graphene Oxide Films as Transparent Conductors," ACS Nano 2, 3, 463-470. doi:10.1021/nn700375n.
Cançado et al. (2011) "Quantifying Defects in Graphene via Raman Spectroscopy at Different Excitation Energies," Nano Letters; 11(8):3190-3196. doi:10.1021/nl201432g.
Casiraghi et al. (2007) "Raman fingerprint of charged impurities in graphene," Applied Physics Letters 91, 233108. doi:10.1063/1.2818692.
Celzard et al. (2002) "Electrical conductivity of carbonaceous powders," Carbon 40(15):2801-2815. doi:10.1016/s0008-6223(02)00196-3.
Chen et al. (2016) "Reduced Graphene Oxide Films with Ultrahigh Conductivity as Li-Ion Battery Current Collectors," Nano Letters. 16, 6, 3616-3623. doi:10.1021/acs.nanolett.6b00743.
Chen et al. (2017) "A Defect-Free Principle for Advanced Graphene Cathode of Aluminum-Ion Battery," Advanced Materials. 29(12): 1605958. doi:10.1002/adma.201605958.
Chen et al. (2017) "High-Quality Graphene Microflower Design for High-Performance Li-S and Al-Ion Batteries," Advanced Energy Materials 7, 1700051. doi:10.1002/aenm.201700051.
Chen et al. (2018) "Synthesis and applications of graphene quantum dots: a review," Nanotechnology Reviews 7(2) 157-185. doi:10.1515/ntrev-2017-0199.
Claramunt et al. (2015) "The Importance of Interbands on the Interpretation of the Raman Spectrum of Graphene Oxide," The Journal of Physical Chemistry C 119, 18, 10123-10129. doi:10.1021/acs.jpcc.5b01590.
Coleman (2009) "Liquid-Phase Exfoliation of Nanotubes and Graphene," Advanced Functional Materials 19(23): 3680-3695. doi:10.1002/adfm.200901640.
Díez-Betriu et al. (2013) "Raman spectroscopy for the study of reduction mechanisms and optimization of conductivity in graphene oxide thin films," J. Mater. Chem. C, 1, 6905-6912. doi:10.1039/c3tc31124d.
Dindi et al. (1989) "Thermal and electrical property measurements for coal," Fuel 68, 185-192. doi:10.1016/0016-2361(89)90321-9.
Dong et al. (2014) "Graphene quantum dots, graphene oxide, carbon quantum dots and graphite nanocrystals in coals," Nanoscale. 6, 7410-7415. doi:10.1039/c4nr01482k.
Emiru et al. (2017) "Controlled synthesis, characterization and reduction of graphene oxide: A convenient method for large scale production," Egyptian Journal of Basic and Applied Sciences 4, 74-79. doi:10.1016/j.ejbas.2016.11.002.
Eredia et al. (2016) "Graphene via Molecule-Assisted Ultrasound-Induced Liquid-Phase Exfoliation: A Supramolecular Approach," Physical Sciences Reviews, 1(12), 13 pp. doi: 10.1515/psr-2016-0101.
Fang et al. (2015) "Preparation and photocatalytic degradation activity of $TiO_2$/rGO/polymer composites," Colloid and Polymer Science 293, 1151-1157. doi:10.1007/S00396-015-3507-x.
Fernández-García et al. (2017) "Peculiarities of the production of graphene oxides with controlled properties from industrial coal liquids," Fuel 203, 253-260. doi:10.1016/j.fuel.2017.04.130.
Ferrari et al. (2000) "Interpretation of Raman spectra of disordered and amorphous carbon," Physical Review B 61, 14095-14107. doi:10.1103/physrevb.61.14095.
Filina et al. (Feb. 2019) "Antimicrobial Hierarchically Porous Graphene Oxide Sponges for Water Treatment," ACS Appl. Bio Mater. 2, 4, 1578-1590. doi:10.1021/acsabm.9b00008.
Hernandez et al. (2008) "High-yield production of graphene by liquid-phase exfoliation of graphite," Nature Nanotechnology. 3(9): 563-568. doi:10.1038/nnano.2008.215.
Huang et al. (2017) "Flexible Transparent Electrode of Hybrid Ag-Nanowire/Reduced-Graphene-Oxide Thin Film on PET Substrate Prepared Using H2/Ar Low-Damage Plasma," Polymers. 9(1), 28, 12 pp. doi:10.3390/polym9010028.
Jawhari et al. (1995) "Raman spectroscopic characterization of some commercially available carbon black materials," Carbon; 33(11):1561-1565. doi:10.1016/0008-6223(95)00117-v.
Jeong et al. (2008) "Evidence of Graphitic AB Stacking Order of Graphite Oxides," Journal of the American Chemical Society 130, 1362-1366. doi:10.1021/ja076473o.
Jorio et al. (2010) "Measuring disorder in graphene with the G and D bands," Physica Status Solidi B 247, Nos. 11-12, 2980-2982. doi:10.1002/pssb.201000247.
Kang et al. (Mar. 2019) "Graphene Oxide Quantum Dots Derived from Coal for Bioimaging: Facile and Green Approach," Scientific Reports 9, 4101, 7 pp. doi:10.1038/s41598-018-37479-6.
Keller et al. (2016) "Rethinking Coal: Thin Films of Solution Processed Natural Carbon Nanoparticles for Electronic Devices," Nano Lett. 16, 5, 2951-2957. doi:10.1021/acs.nanolett.5b04735.
Khan et al. (2010) "High-Concentration Solvent Exfoliation of Graphene," Small. 6 (7):864-871. doi:10.1002/smll.200902066.
Kumar et al. (2017) "Facile synthesis of few layer graphene from bituminous coal and its application towards electrochemical sensing of caffeine," Advanced Materials Letters 8, 239-245. doi:10.5185/amlett.2017.7048.
Leandro (Dec. 2019) "Comparative experimental studies on graphene oxide synthesis from alternative carbon sources and their applications," Thesis, University of Wyoming, 109 pp.
Lee et al. (2012) "Uniform Graphene Quantum Dots Patterned from Self-Assembled Silica Nanodots," Nano Letters 12, 6078-6083. doi:10.1021/nl302520m.
Liu et al. (2017) "A Catalytic Microwave Process for Superfast Preparation of High-Quality Reduced Graphene Oxide," Angewandte Chemie 56, 15677-15682. doi.org/10.1002/anie.201708714.
Lotya et al. (2009) "Liquid Phase Production of Graphene by Exfoliation of Graphite in Surfactant/Water Solutions," Journal of the American Chemical Society. 131(10):3611-3620. doi:10.1021/ja807449u.
Lowe et al. (2017) "Challenges of Industrial-Scale Graphene Oxide Production," in: A.M. Dimiev, S. Eigler (Eds.) Graphene Oxide: Fundamentals and Applications, John Wiley & Sons, Ltd., pp. 410-431.
Lucchese et al. (2010) "Quantifying ion-induced defects and Raman relaxation length in graphene," Carbon 48, 1592-1597. doi:10.1016/j.carbon.2009.12.057.
Lv et al. (2018) "Hydrothermal Synthesis of Ultra-Light Coal-Based Graphene Oxide Aerogel for Efficient Removal of Dyes from Aqueous Solutions," Nanomaterials. 8(9) 670. doi:10.3390/nano8090670.
Ma et al. (2016) "Bottom-Up Fabrication of Activated Carbon Fiber for All-Solid-State Supercapacitor with Excellent Electrochemical Performance," ACS Applied Materials & Interfaces. 8(23):14622-14627. doi:10.1021/acsami.6b04026.
Ma et al. (Apr. 2019) "The correlation between electrical conductivity and second-order Raman modes of laser-reduced graphene oxide," Physical Chemistry Chemical Physics 21, 10125-10134. doi:10.1039/c9cp00093c.
Marcano et al. (2010) "Improved Synthesis of Graphene Oxide," ACS Nano 4, 8, 4806-4814. doi:10.1021/nn1006368.

(56) References Cited

OTHER PUBLICATIONS

Marinho et al. (2012) "Electrical conductivity of compacts of graphene, multi-wall carbon nanotubes, carbon black, and graphite powder," Powder Technology, 221, 351-358. doi:10.1016/j.powtec. 2012.01.024.

Martín-García et al. (2012) Functionalization of Reduced Graphite Oxide Sheets with a Zwitterionic Surfactant, ChemPhysChem 13(16):3682-3690. doi:10.1002/cphc.201200501.

Mathews et al. (2012) "The molecular representations of coal—A review," Fuel, 96, 1-14. doi:10.1016/j.fuel.2011.11.025.

Mei et al. (2010) "Highly efficient photoluminescent graphene oxide with tunable surface properties," Chemical Communications 46, 7319-7321. doi:10.1039/c0cc02374d.

Nemanich et al. (1979) "First- and second-order Raman scattering from finite-size crystals of graphite," Physical Review B, 20(2):392-401. doi:10.1103/physrevb.20.392.

Pakhira et al. (2015) "Extraction of preformed graphene oxide from coal: its clenched fist form entrapping large molecules," RSC Advances. 5, 89076-89082. doi:10.1039/c5ra15699h.

Park et al. (2008) "Aqueous Suspension and Characterization of Chemically Modified Graphene Sheets," Chemistry of Materials 20, 6592-6594. doi:10.1021/cm801932u.

Pérez-Rodríguez et al. (2018) "Effect of oxygen and structural properties on the electrical conductivity of powders of nanostructured carbon materials," Powder Technology 340, 380-388. doi:10.1016/j.powtec.2018.09.038.

Pimenta et al. (2007) "Studying disorder in graphite-based systems by Raman spectroscopy," Phys. Chem. Chem. Phys. 9, 1276-1290. doi:10.1039/b613962k.

Powell et al. (2015) "Graphene oxide and graphene from low grade coal: Synthesis, characterization and applications," Current Opinion in Colloid & Interface Science, vol. 20, Issues 5-6, 362-366.

Reich et al. (2004) "Raman spectroscopy of graphite," Phil. Trans. R. Soc. A. 362:2271-2288. doi:10.1098/rsta.2004.1454.

Rishi Kumar (2017) "Scalable Synthesis of Graphene Quantum Dots from Coal" NANO 120B.

Roscher et al. (Jan. 2019) "Determination of the graphene-graphite ratio of graphene powder by Raman 2D band symmetry analysis," Analytical Methods 11(9) 1224-1228.

Rosillo-Lopez et al. (2016) "A simple and mild chemical oxidation route to high-purity nano-graphene oxide," Carbon 106, 56-63. doi:10.1016/j.carbon.2016.05.022.

Sadezky et al. (2005) "Raman microspectroscopy of soot and related carbonaceous materials: Spectral analysis and structural information," Carbon 43, 1731-1742. doi:10.1016/j.carbon.2005.02. 018.

Saito et al. (2011) "Raman spectroscopy of graphene and carbon nanotubes," Advances in Physics, 60:3, 413-550. doi:10.1080/00018732.2011.582251.

Savitskii (2017) "Preparation and characterization of colloidal dispersions of graphene-like structures from different ranks of coals," Journal of Fuel Chemistry and Technology. 45(8), 897-907. doi:10. 1016/s1872-5813(17)30043-9.

Sharma et al. (2015) "Surfactant assisted liquid phase exfoliation of graphene via probe tip sonication," AIP Conference Proceedings 1675, 030047. doi:10.1063/1.4929263.

Sierra et al. (2016) "Cokes of different origin as precursors of graphene oxide," Fuel 166, 400-403. doi:10.1016/j.fuel.2015.10. 112.

Sorokina et al. (2001) "Anodic Oxidation of Graphite in 10 to 98% $HNO_3$," Inorganic Materials. 37, 360-365. doi:10.1023/a:1017575710886.

Stankovich et al. (2007) "Synthesis of graphene-based nanosheets via chemical reduction of exfoliated graphite oxide," Carbon 45, 1558-1565. doi:10.1016/j.carbon.2007.02.034.

Swain et al. (2014) "Enhanced Stability of Reduced Graphene Oxide Colloid Using Cross-Linking Polymers," The Journal of Physical Chemistry C 118, 9450-9457. doi:10.1021/jp500205n.

Tan et al. (Jun. 2019) "Understanding the supercapacitor properties of electrospun carbon nanofibers from Powder River Basin coal," Fuel 245, 148-159. doi:10.1016/j.fuel.2019.01.141.

Tkalya et al. (2010) "Latex-based concept for the preparation of graphene-based polymer nanocomposites," Journal of Materials Chemistry, 20, 3035-3039. doi:10.1039/b922604d.

Tuinstra et al. (1970) "Raman Spectrum of Graphite," The Journal of Chemical Physics 53, 1126-1130. doi:10.1063/1.1674108.

Vallés et al. (2012) "Flexible conductive graphene paper obtained by direct and gentle annealing of graphene oxide paper," Carbon. 50, 835-844. doi:10.1016/j.carbon.2011.09.042.

Vasireddy et al. (2011) "Clean liquid fuels from direct coal liquefaction: chemistry, catalysis, technological status and challenges," Energy Environ. Sci. 4, 311-345. doi:10.1039/c0ee00097c.

Vollebregt et al. (2012) "Influence of the growth temperature on the first and second-order Raman band ratios and widths of carbon nanotubes and fibers," Carbon. 50, 3542-3554. doi:10.1016/j.carbon. 2012.03.026.

Wahab et al. (2015) "Signatures of different carbon bonds in graphene oxide from soft x-ray reflectometry," X-Ray Spectrometry 44, 468-473. doi:10.1002/xrs.2653.

Wahab et al. (2016) "The structural response of graphene on copper to surface-and interfacial-oxygen," Carbon 110, 414-425. doi:10. 1016/j.carbon.2016.09.028.

Wang et al. (2011) "Characteristics of Raman spectra for graphene oxide from ab initio simulations," The Journal of Chemical Physics 135, 184503. doi:10.1063/1.3658859.

Wilson et al. (2009) "Graphene Oxide: Structural Analysis and Application as a Highly Transparent Support for Electron Microscopy," ACS Nano 3, 9, 2547-2556. doi:10.1021/nn900694t.

Worsley et al. (2014) "Synthesis and Characterization of Highly Crystalline Graphene Aerogels," ACS Nano 8, 11013-11022. doi:10. 1021/nn505335u.

Wu et al. (2009) "Synthesis of Graphene Sheets with High Electrical Conductivity and Good Thermal Stability by Hydrogen Arc Discharge Exfoliation," ACS Nano 3, 2, 411-417. doi:10.1021/nn900020u.

Wu et al. (2013) "Efficient and Large Scale Synthesis of Graphene from Coal and Its Film Electrical Properties Studies," Journal of Nanoscience and Nanotechnology. 13(2) 929-932. doi:10.1166/jnn. 2013.6001.

Wu et al. (2018) "Raman spectroscopy of graphene-based materials and its applications in related devices," Chemical Society Reviews 47, 1822-1873. doi:10.1039/c6cs00915h.

Ye et al. (2013) "Coal as an abundant source of graphene quantum dots," Nat Commun 4, 2943. doi:10.1038/ncomms3943.

Yu et al. (2016) "High-efficient Synthesis of Graphene Oxide Based on Improved Hummers," Method. Sci Rep 6, 36143. https://doi.org/10.1038/srep36143.

Zaaba et al. (2017) "Synthesis of Graphene Oxide using Modified Hummers Method: Solvent Influence," Procedia Engineering 184, 469-477. doi:10.1016/j.proeng.2017.04.118.

Zhou et al. (2014) "Film Structure of Epitaxial Graphene Oxide on SiC: Insight on the Relationship Between Interlayer Spacing, Water Content, and Intralayer Structure," Advanced Materials Interfaces 1(3):1300106. doi:10.1002/admi.201300106.

\* cited by examiner

METHODS FOR PRODUCTION OF GRAPHENE OXIDE

CROSS-REFERENCE TO RELATED APPLICATIONS

This application claims the benefit of and priority to U.S. Provisional Patent Application No. 62/961,550, filed Jan. 15, 2020, which is hereby incorporated by reference in its entirety.

BACKGROUND OF INVENTION

Graphene oxide nanomaterials have significant roles in the transformation of applications in the future. By tuning the size of graphene oxide particles, the optical, physical and chemical properties can be controlled for applications in bioimaging and biosensing [1,2] and water treatment applications [3,4]. Thermally reduced graphene oxides are often used in electrochemical energy storage applications [5]. One reason why the mass production of graphene oxide at a low cost is a major challenge is due to the choice of carbonaceous precursor for the synthesis. Graphite is commonly used and is widely studied, but the type and size of the graphite feed influences not only the cost but also the entire process as well as the use of the final product [6].

Among the various methods to chemically synthesize graphene oxide from coal, the modified Hummers' method yields about 20 wt % exfoliation with an atomic C/O ratio of 3.5 [11]. Monolayer GO crystals were measured to have lateral sizes of 300 nm-400 nm. Other groups used coal liquid such as impregnation tar and anthracene oil to produce broader lateral size distributions with interlayer spacing of about 0.9 nm and heights averaged at 1.2 nm [12]. Savitskii et al. used a similar chemical oxidation method to produce colloidal GO dispersions 122 nm-190 nm in size from anthracite coal [13]. Although higher ranking coal yields more graphitized carbon content, upscaling the Hummers' method requires handling KMnO4 which is chemically hazardous and costly [6]. On the other hand, it has been demonstrated that GO can be extracted by leaching low-grade coal with $_{HNO}$ [14]. However, the large GO sheets are unstable and can be fragmented into smaller sizes between 40 nm-200 nm.

Raman spectroscopy is a prominent method to study graphene-related systems [15]. Common Raman peaks in crystalline graphene include the G-(~1585 $cm^{-1}$) and the 2D-bands (~2700 $cm^{-1}$), associated with the first- and second-order allowed Raman mode E2g, respectively [16], while the appearance of an intense peak centered at ~1350 $cm^{-1}$, called the D-band, is attributed to high defect concentration related to the oxidation. The D-band is due to the A1g breathing mode, and it is observed when the basal plane structure of graphene is altered during graphite oxidation and the subsequent reduction of GO [17]. Compared to pristine graphene or graphite, some weak peaks centered between 1100 $cm^{-1}$ and 1800 $cm^{-1}$ were observed in GO flakes and powders [18,19]. Among these peaks is the D"-band, which some authors have related to the vibrational density of states in graphite crystals of finite sizes [20]. S. Vollebregt et al. attributed the band to amorphous lattices after observing an inverse relationship of the decrease in D"-peak intensity with increase in crystallinity [21]. Other groups support the association of the D"-band with amorphous carbon fragments which may be functionalized small molecules at interstitial defects in sp2-domains [22-24].

Graphene oxide is often reduced thermally via annealing to synthesize a broad range of graphene-derived materials and devices. The thermal effects result in higher degree of reduction than conventional chemical reductions, which restores sp2 carbon domains that improves electrical properties of GO. For graphene films, the quality of the graphene is governed by the reducing atmosphere in which the annealing takes place, in vacuuo [25] or in reducing environments [26,27]. Wu et al. have used hydrogen arc-discharge to exfoliate graphite oxide and reported high electrical conductivity ~2·105 S $m^{-1}$ [28]. Other groups reported similar conductivities for coal-derived graphene films after annealing to 1100° C. for 3 h under Argon flow [29]. Chen et al. reported reduction of graphene oxide films at ultrahigh-temperatures (2477° C.) where the reduced films had an electrical conductivity of ~3·105 S $m^{-1}$ [30]. The high-temperature annealing was reported to be crucial in repairing defects in reduced graphene oxides by allowing dangling bonds to form bond bridges between adjacent layers. Even higher electrical conductivities were reported by Gao et al., who annealed chemically reduced graphene oxides at 3000° C. [31]. The high-temperature annealing was reported to restore the sp2 content almost completely, resulting in a Raman ID/IG ratio near zero and an electrical conductivity nearly 6·105 $m^{-1}$.

In comparison with graphene films synthesized from pristine graphite, studies using coal-derived materials for graphene synthesis report large variations in its electrical conductivity. Keller et al. reported fabricated thin films from four types of coal with increasing degrees of crystallinity from lignite, low- and high-volatile bituminous, to anthracites [32]. After thermal processing, depending on coal type and temperature regimes, the authors reported tuning electrical conductivity of coal films over seven orders of magnitude to a maximum of ~103 S $m^{-1}$. Tan et al. reported fabricated carbon nanofibers from coal char and with an increased degree of graphitization, which resulted in high conductivities (~760 S $m^{-1}$) suitable for supercapacitors [33]. Ma et al. reported use of graphene oxide as a binder to synthesize carbon nanofibers from active carbon, which demonstrated remarkable electrical conductivities (~180 S $m^{-1}$) [34].

U.S. patent application publication No. US 2018/0282163 describes methods of making graphene quantum dots from anthracite coal and biochar using 70% $HNO_3$, with a reported 30% mass yield of graphene quantum dots.

Carbon materials in bulk powder form are widely used as fillers in polymeric matrices [35]. The electrical conductivity of bulk powder is generally lower than that in thin films, since the interface between the particles offers extra resistance to charge transport. Thus, bulk conductivity depends on both the intrinsic material properties and the amount of contact between particles. Marinho et al. reported bulk conductivities for graphene, carbon nanotubes and carbon black with lower values (~102 S $m^{-1}$) as compared to graphite (~103 S $m^{-1}$) [36]. Other groups report that bulk carbons generally possess conductivities within that same range, and that annealing amorphous ordered mesoporous carbon at 1500° C. results in conductivities of ~9500 S $m^{-1}$ [37]. Hitherto the electrical conductivity of coal and coal chars has been investigated but primarily in the context of fuel processing in coal gasification programs [38].

Thus, it can be seen that advancements in feedstocks and synthesis methods for graphene oxide are needed.

SUMMARY OF THE INVENTION

Provided herein are graphene oxide products and methods for producing graphene oxide products. In one embodiment, a method of producing a graphene oxide product includes charring a carbon-containing feedstock, grinding the carbon-containing feedstock, separating the carbon-containing feedstock to produce a carbon-containing powder having a preselected particle size distribution, contacting the carbon-containing feedstock with an oxidizing composition comprising nitric acid to form a reactant slurry, controlling the temperature of the reactant slurry, in response to the contacting and controlling steps, oxidizing the carbon-containing feedstock of the reactant slurry to form a graphite oxide slurry, sonicating the graphite oxide slurry to form a graphene oxide slurry, diluting the graphene oxide slurry with water, filtering graphene oxide solids from the graphene oxide slurry, lyophilizing the graphene oxide solids and, annealing the graphene oxide solids. The oxidizing composition may comprise 50 to 63 wt. % nitric acid. The temperature of the slurry may be controlled to a temperature between room temperature and boiling. The graphene oxide solids may be annealed to a temperature of 250° C.

Methods for producing graphene oxide products are disclosed. In one embodiment, a method of producing a graphene oxide product includes contacting a carbon-containing feedstock with an oxidizing composition comprising aqueous nitric acid, wherein the concentration of nitric acid in the oxidizing composition is 50 to 63 wt %, to from a reactant slurry, in response to the contacting step, oxidizing the carbon-containing feedstock of the reactant slurry to form a graphite oxide slurry; and processing the graphite oxide slurry into a graphene oxide product.

In one embodiment, the carbon-containing feedstock is charred biomass, biochar, coal, coal char, dimethylformamide (DMF) extracted coal residue, coal EL, or coke or combinations thereof. In another embodiment, the carbon-containing feedstock consists of: charred biomass, biochar, coal, coal char, dimethylformamide (DMF) extracted coal residue, coal EL, or coke or combinations thereof. In one embodiment, the method optionally further comprises charring the carbon-containing feedstock. In one embodiment, the method optionally further comprises grinding the carbon-containing feedstock. The method of any of the preceding embodiments, optionally further comprises separating the carbon-containing feedstock to remove particles larger than 200 μm and smaller than 2 μm. In one embodiment, the separating step comprises separating the carbon-containing feedstock to remove particles larger than 150 μm. In one embodiment, the separating step comprises separating the carbon-containing feedstock to remove particles larger than 100 μm. In one embodiment, the separating step comprises mechanically separating the carbon-containing feedstock to remove particles larger than 80 μm. In one embodiment, the separating step comprises mechanically separating the carbon-containing feedstock to remove particles larger than 50 μm. In one embodiment, the separating step comprises mechanically separating the carbon-containing feedstock to remove particles larger than 20 μm.

In one embodiment, the oxidizing composition comprises 50 to 63 wt. % nitric acid. In one embodiment, the oxidizing composition comprises 52 to 62 wt. % nitric acid. In one embodiment, the oxidizing composition comprises 54 to 61 wt. % nitric acid. In one embodiment, the oxidizing composition comprises 56 to 60 wt. % nitric acid.

In one embodiment, nitric acid is the only oxidizing agent in the oxidizing composition. In one embodiment, the oxidizing composition is essentially free of sulfuric acid. In one embodiment, the oxidizing composition is essentially free of sulfuric acid, sodium nitrate, potassium permanganate and phosphoric acid.

In one embodiment, the temperature of the reactant slurry during the contacting step is at a temperature between room temperature and boiling. In one embodiment, the method comprises controlling the temperature of the reactant slurry during the contacting step to a temperature between 40 and 100° C. In one embodiment, the method comprises controlling the temperature of the reactant slurry during the contacting step to a temperature between 50 and 90° C. In one embodiment, the method comprises controlling temperature of the reactant slurry during the contacting step to a temperature between 60 and 80° C. In one embodiment, the method comprises controlling the temperature of the reactant slurry during the contacting step to a temperature between 65 and 75° C. In one embodiment, the oxidation reaction is conducted at ambient pressure. In one embodiment, the oxidation reaction is conducted at a pressure between 0.5-2 atmospheres.

In one embodiment, the step of processing the graphite oxide slurry into a graphene oxide product comprises sonicating the graphite oxide slurry to form a graphene oxide slurry. In one embodiment, the step of processing the graphite oxide slurry into a graphene oxide product comprises: filtering graphene oxide solids; and lyophilizing the graphene oxide solids. In one embodiment, the step of processing the graphite oxide slurry into a graphene oxide product comprises annealing graphene oxide solids.

In one embodiment, the annealing step comprises heating the graphene oxide solids to a temperature of 150 to 400° C. In one embodiment, the annealing step comprises heating the graphene oxide solids to a temperature of 175 to 325° C. In one embodiment, the annealing step comprises heating the graphene oxide solids to a temperature of 200 to 300° C. In one embodiment, the annealing step comprises heating the graphene oxide solids to a temperature of 225 to 275° C.

In one embodiment, the method comprises controlling the rate of heating during the annealing step. In one embodiment, the method comprises controlling the rate of heating during the annealing step to 0.1 to 1° C. per minute. In one embodiment, the method comprises controlling the rate of heating during the annealing step to not greater than 0.2° C. per minute. In one embodiment, the method comprises controlling the rate of heating during the annealing step to at least 0.4° C. per minute.

In one embodiment, a reactant slurry comprises carbon-containing feedstock solids and an oxidizing composition, wherein the oxidizing composition comprises 10 to 45 wt. % aqueous nitric acid.

The methods of the present disclosure generally do not produce appreciable amounts of graphene oxide quantum dots (GOQD). For example, in one embodiment, the methods of the present disclosure yield 1 wt % or less graphene oxide quantum dots. In one embodiment, the methods of the present disclosure yield no detectable graphene oxide quantum dots.

In one embodiment, coal char may produce high quality graphene. Without wishing to be bound by theory, by annealing the coal prior to GO synthesis, possibly some of the structure of the amorphous carbon is restored as well as some graphene sheets already present in the coal structure. In some embodiments, the coal may be ground and charred at 750-900° C. for 5-10 minutes. For example, in one embodiment, the coal may be ground and then charred at about 850° C. for 5-10 minutes. In some embodiments, the coal may be left as lump coal and charred at 750-900° C. for about 30 minutes. For example, in one embodiment, the lump coal may be charred at about 850° C. for about 30 minutes. In one embodiment, charred lump coal may be ground after charring.

Without wishing to be bound by any particular theory, there may be discussion herein of beliefs or understandings of underlying principles relating to the devices and methods disclosed herein. It is recognized that regardless of the ultimate correctness of any mechanistic explanation or hypothesis, an embodiment of the invention can nonetheless be operative and useful.

DETAILED DESCRIPTION OF THE INVENTION

Figure 1:
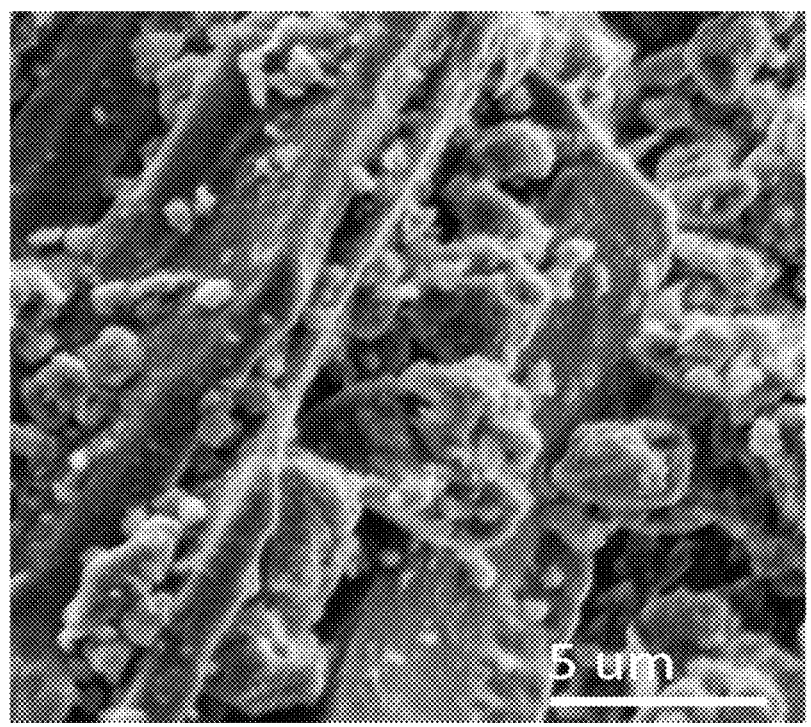
FIG. 1 is a SEM micrograph of coal GO showing granular morphology that is scattered over layered surfaces.

In the following description, numerous specific details of the devices, device components and methods of the present invention are set forth in order to provide a thorough explanation of the precise nature of the invention. It will be apparent, however, to those of skill in the art that the invention can be practiced without these specific details.

In one aspect of the invention, graphene oxide may be synthesized from coal using a nitric acid method. The absorption at ultraviolet-visible light energies and thermal decomposition properties for graphene oxide (GO) produced by the methods of the invention are comparable to GO fabricated using the modified Hummers' method. Results show that the synthesis of GO from coal has higher oxygen content and more disordering than that from charred coal. Similar observations are extended for coal residues, making coal a promising candidate for an environmentally friendly synthesis approach. The electrical conductivity of powder coal char reduced graphene oxide is increased to more than 4000 S m$^{-1}$ at 2500° C. At that temperature, the nitric acid method of the invention generated the highest conductivity of ~5000 S m$^{-1}$ in comparison to modified Hummers' of ~2000 S m$^{-1}$. For coal-derived graphene, an additional Raman feature D" related to the presence of amorphous phase in carbonaceous materials is found. The consideration of this feature along with the ratio of sp2-hybridized carbon atoms to structural defects and second-order Raman modes may be used to characterize the electrical properties of thermally reduced graphene oxide.

In some embodiments, nitric acid is the only oxidizing agent in the oxidizing composition. In one embodiment, the oxidizing composition is essentially free of sulfuric acid. As used herein "essentially free" means containing less than a threshold amount such that the resulting product mixture is not detectably modified. In some embodiments, essentially free means comprising less than 1 wt. %. In some embodiments, essentially free means no measurable amount.

In one embodiment, stable GO may be synthesized from sub-bituminous coal and coal char using the $HNO_3$ method of the disclosure and variations of the Hummers' method. Results herein show a structural difference between GO synthesized from coal and coal char and observe a higher degree of graphitization in the latter. The inventors have demonstrated that coal-derived graphene presents electrical properties suitable for energy-storage applications. Furthermore, in one aspect of the invention, from high-temperature annealing of coal char GO allows for increased electrical conductivity and quality of the reduced graphene.

The invention can be further understood by the following non-limiting examples. Several carbon-containing feedstocks were used to synthesize graphene oxide, including the sub-bituminous Powder River Basin (PRB) coal, PRB coal char, dimethylformamide (DMF) extracted PRB coal residue (Coal EL), annealed, coal EL, graphite and commercial biochar (High Plains, Laramie).

Experimental Setup and Methods

In a preferred embodiment, the carbon-containing feedstock is sub-bituminous coal. In a more preferred embodiment, the carbon-containing feedstock may be sub-bituminous coal derived from the Powder River Basin (PRB coal). The sub-bituminous coal may be annealed to around 850° C., for example to a temperature between 800-900° C., to produce coal char. In some embodiments, sub-bituminous coal may be extracted using dimethylformamide (DMF), to produce coal extraction residues (ER) and annealed coal ER, or coal ER char. In one embodiment, the carbon-containing feedstock may comprise commercial bio char, such as that provided by High Plains, of Laramie WY.

Graphene oxide was synthesized from the carbon-containing feedstocks mentioned above. The samples were ground and sieved to 20 μm powder samples.

In the examples described herein, the method was conducted at ambient pressure. For example, in some embodiments, the methods of the present disclosure may be conducted at a pressure of 0.5 to 2 atm. Those of ordinary skill in the art will appreciate that the methods can be adapted for higher pressures. For example, temperatures may be adjusted in accordance with higher pressures.

Modified Hummers' Method

GO samples were prepared using modified Hummers' method. In this procedure, the powder samples were mixed in a mixture of concentrated $H_2SO_4$ and $NaNO_3$ and placed in an ice bath. Then, KMnO4 was added at a mixture temperature of 35° C. and increased further to 98° C. before termination with Millipore ultrapure water and $H_2O_2$. The filtrate was then washed with HCl and subsequently with water repeatedly until a pH-level of about 6.5 was obtained.

Improved Hummers' Method

This method is similar to modified Hummers' method with the exception that $H_3PO_4$ was substituted for $NaNO_3$. By omitting $NaNO_3$, the improved Hummers' method avoids the generation of hazardous gases such as NO, and $NO_2$ from nitrate. The use of $H_3PO_4$ is believed beneficial in maintaining the structure of the carbocyclic rings.

Inventive $HNO_3$ Method

Instead of using $H_2SO_4$, $NaNO_3$ and $KMnO_4$, the carbonaceous powder samples were mixed with concentrated $HNO_3$ (70% $HNO_3$ in water) that was diluted with distilled water to a ratio of 3:1. After an ultrasonic bath at 70° C., the sample was diluted with water further to a ratio of 1:10. The mixture was filtered until a comparable pH-level to Hummers' GO was reached.

All GO powder GO samples were then freeze-dried.

Annealing

The coal-derived GO powders were annealed in an Argon environment at a rate of 20° C./min up to 2500° C.; the powders were annealed at that temperature for 30 mins. The electrical conductivity was measured using a method similar to that described in the literature [40]. Assumptions include negligible morphological effects of granular particles and that the applied pressure, environmental temperature and humidity is constant for all measurements. The powder was poured into a ceramic tube (h=7.95 mm, d=3.30 mm) and compressed between two steel plungers at an applied pressure of 30 MPa. Vernier calipers (Mitutoyo, Japan) were used to ensure the constant height of the compressed powder column. The two electrode ends connect the plungers to an LCR precision meter (7600 Plus Precision, IET Labs) to measure DC conductivity by a two-probe method.

To investigate the sample morphologies, scanning electron microscope (SEM, FEI Quanta 250), atomic force microscope (AFM, Asylum Research Cyper) and transmission electron microscope (TEM, FEI Tecnai $G^2$ F20) were used. For the Raman characterizations, a 532 nm light source was used to record a span of energy 200 $cm^{-1}$-3000 $cm^{-1}$. Five measurements from each sample with a collection time of 10 s under identical conditions were gathered and averaged. The Raman fitting parameters are discussed below.

Influence of the Size of Carbon-Containing Feedstock on GO Product

In order to synthesize and compare graphene oxide from different carbon-containing feedstocks, some steps were taken prior to the performance of the chosen methodology to assure reproducibility. The first study conducted was the influence of the particle size of the carbon-containing feedstock on the GO product. The samples were first ground using a ball mill, and then a coffee grinder. Then the samples were sieved, and different mesh sizes were chosen for synthesis and further analysis. The inventors have discovered that carbon-containing feedstock powders having a particle size lower than 20 microns results in higher levels of oxidation. Larger particle sizes, such as those isolated via mesh sizes of 20 or 60 μm, result in bulky samples after synthesis, indicating that the oxidation was only happening at the outer surface of the carbon source.

Coal Charring

The PRB coal and the coal extract leftover (coal EL) was ground and placed on an appropriate crucible and placed in a high temperature furnace at 850 Celsius. The sample was charred under air for 5-10 minutes after the combustion started. After the selected time, the sample was removed from the furnace and left to cool to be further collected for studies.

Coal Extraction

Coal was extracted using DMF. After the extraction, both the extracted coal and the residual material were dried using a vacuum oven at 100° C. for 2-3 days, in order to remove remaining DMF.

Synthesis of Graphene Oxide

In order to find a suitable route to synthesize graphene oxide, many attempts were made to find appropriate methodology and ratios that worked for all the carbon-containing feedstocks of this study. First, the route conducted by Kumar et al was attempted [39]. This study focused on the electrochemical properties of graphene, more specifically for application in sensors. Their goal was to investigate the caffeine detection capability of graphene synthesized by using a modification of the Hummer's method having bituminous coal as the carbon source. When performing this method with Wyoming sub-bituminous coal, the sample would turn black, unlike the usual yellow-brown characteristic color of graphene oxide, which indicates some degree of reduction or incomplete oxidation. Further, the modified Hummers' method was attempted with many different ratios and step lengths until further characterization methods confirmed the synthesis of graphene oxide from the coal source. However, when using this methodology with graphite powder as the starting material, the sample would turn dark brown or black as well, once more, indicating a lower oxidation level on the graphene oxide sheets. Also, if the temperature was not carefully controlled during the addition of potassium permanganate, the slurry solution would become slightly explosive. Hence, the improved Hummers' method proposed by Marcano et al [41] was conducted in an attempt to produce high quality GO from both graphite and the other carbon sources. The later worked as expected and showed a higher degree of oxidization of the graphite, providing GO of yellowish coloration that offered higher conductivity upon annealing by laser ablation. Moreover, the improved method had the benefit of operating at a constant temperature during the process with little to no volatilization of gases during the synthesis. Yet, this methodology takes 12 to 16 hours to be completed and requires, as other modification methods, a vast number of reactants. Studies have shown that ratios of $H_2SO_4/HNO_3$ could also work as oxidizer agents for the synthesis of graphene oxide and GO quantum dots [42]. Different methods using only $HNO_3$ were also described [1,14,43-45]. Further, literature studies have also shown the influence of ultrasound and shear force for the exfoliation of sheets [46-51] and the use of both concomitantly [52]. The methods of the present invention, on the other hand, provide a fast one-step synthesis of graphene oxide from several coal sources and biochar using $HNO_3$ as the only strong oxidizer. The inventive methods combine the strong oxidizing behavior of $HNO_3$ as well as the presence of ultrasonication while shear force is applied. This synthesis provides good quality graphene oxide from the lower grade sub-bituminous Wyoming PRB coal, with improved conductivity when compared to other methods. The methods mentioned above are described and compared to the inventive method below.

Kumar's Hummer Method 2 g bituminous coal powder was added into a 250 ml beaker, then 1 g $NaNO_3$ and 46 ml $H_2SO_4$ were added into it sequentially under stirring for 24 hrs. Then the mixture was further stirred for 6 hrs at 80° C. Then the heating source was turned off and the sample left to cool to room temperature. The solution was then diluted by 1M $HNO_3$. The resulting graphene oxide was washed with ultrapure Millipore water using centrifugation for 10 min multiple times, until the pH reached ~7.

Modified Hummer's Method

GO was prepared by using a modified Hummers method. In a regular synthesis procedure, 10 g grams of the sample was mixed with 230 mL of concentrated $H_2SO_4$ and 5 grams of NaNO3 in a beaker and placed in an ice bath under 900 rpm overhead stirring for 1 hours in order to start separating the layers. Secondly, very slowly, 15 g of potassium permanganate was added to the mixture while stirring and keeping the temperature under 15° C. for 1 hour. Then, the mixture temperature was raised to 35 Celsius by removing the ice bath and placing a heat source under the beaker. Lastly, 200 mL of distilled water was added to mixture and the temperature of the sample was kept at 98° C. for 30 min. To terminate the reaction, without any source of heat another 400 mL of distilled water was added to the mixture followed by 30% $H_2O_2$. The mixture was filtered and washed multiple times with 10% HCl to remove the permanganate ions, followed by addition of distilled water until the sample reached approximately pH=6-6.9. Next, the sample was decanted and centrifuged and thereafter frozen and freeze-dried.

Improved Hummers' Method

First a solution prepared by mixing 40 mL of concentrated phosphoric acid and 360 mL of concentrated sulfuric acid is prepared. The carbon source is then added to this solution slowly since the reaction is exothermic. Further, 9g potassium permanganate is added, and the solution is placed in an oil bath set to 50° C. The reaction takes 12-16 hours and is finished by dumping the slurry in an ice bath with approximately 30 mL of 30% $H_2O_2$. The solution immediately turned yellow. The mixture was then filtered and the filtered solid washed multiple times with 10% HCl, followed by distilled water until the sample reached approximately pH=6-6.9. As previously, the sample was decanted and centrifuged and thereafter frozen and freeze-dried.

Inventive $HNO_3$ Method

GO was prepared by strong oxidation of various carbon-containing feedstocks using a strong acid, $HNO_3$. 100g grams of the carbon-containing feedstock was mixed in a beaker with a liquid solution of concentrated $HNO_3$/Distilled Water at the ratio 450 ml/75 ml, respectively. The nitric acid solution was added very slowly to the carbon source in the beaker in an ice bath. The beaker was then placed in the sonication bath, with 900 rpm overhead stirring for 4 hours at 70° C. The sample was then diluted 1:10 with distilled water and the mixture was filtered and washed multiple times with distilled water until the sample reached approximately pH=6-6.9. Next, the sample was decanted and centrifuged to be thereafter frozen and freeze-dried.

In order to examine high-temperature annealing effects on powder GO conductivity, the coal-derived GO powders were annealed in an Argon environment in a graphite furnace with regular intervals up to 2500° C. and held at that temperature for 30 mins with an annealing rate of 20° C./min at each step. The electrical conductivity was measured using a method similar to that described in the literature [30]. Negligible morphological effects of granular particles is assumed and that the applied pressure, environmental temperature and humidity is constant for all measurements. Briefly, a given quantity of powder was poured into a ceramic tube (h=7.95 mm, d=3.30 mm) and manually compressed between two steel plungers that fit closely to the tube. The two electrode ends connect the plungers to an LCR precision meter (7600 Plus Precision, IET Labs) to measure DC conductivity by a two-probe method. Vernier calipers were used to ensure the constant height of the powder column for each compression.

To investigate the samples, scanning electron microscope (SEM, FEI Quanta 250), atomic force microscope (AFM, Asylum Research Cyper) and transmission electron microscope (TEM, FEI Tecnai G2 F20) were used. For the Raman characterizations, a 532 nm light source was used to record a span of energy 200 $cm^{-1}$-3000 $cm^{-1}$. Five measurements were gathered and averaged from each sample with a collection time of 10 s under identical conditions.

Characterization Methods

SEM

Figure 10A:
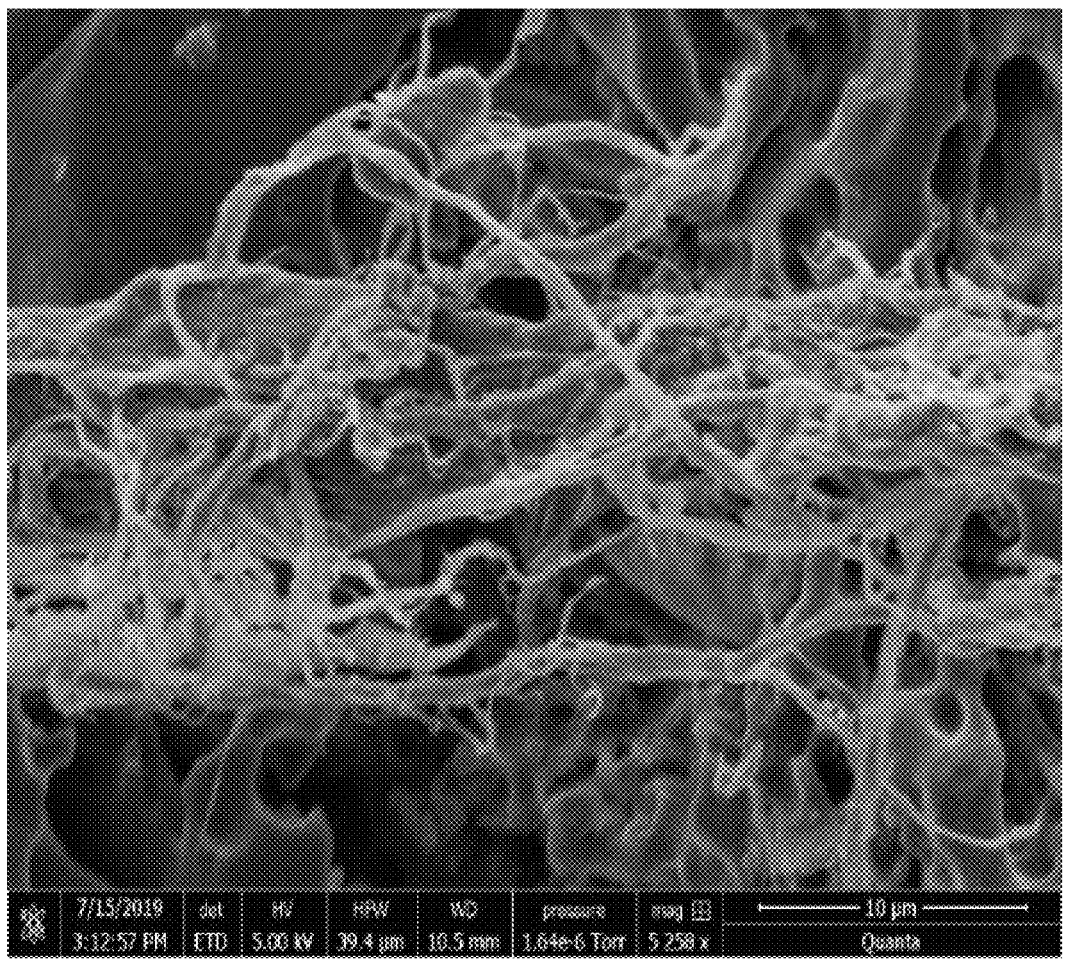
FIGS. 10A-C show SEM micrographs of GO synthesized from coal char using the improved Hummers', modified Hummers', and $HNO_3$ method, respectively.
Figure 10B:
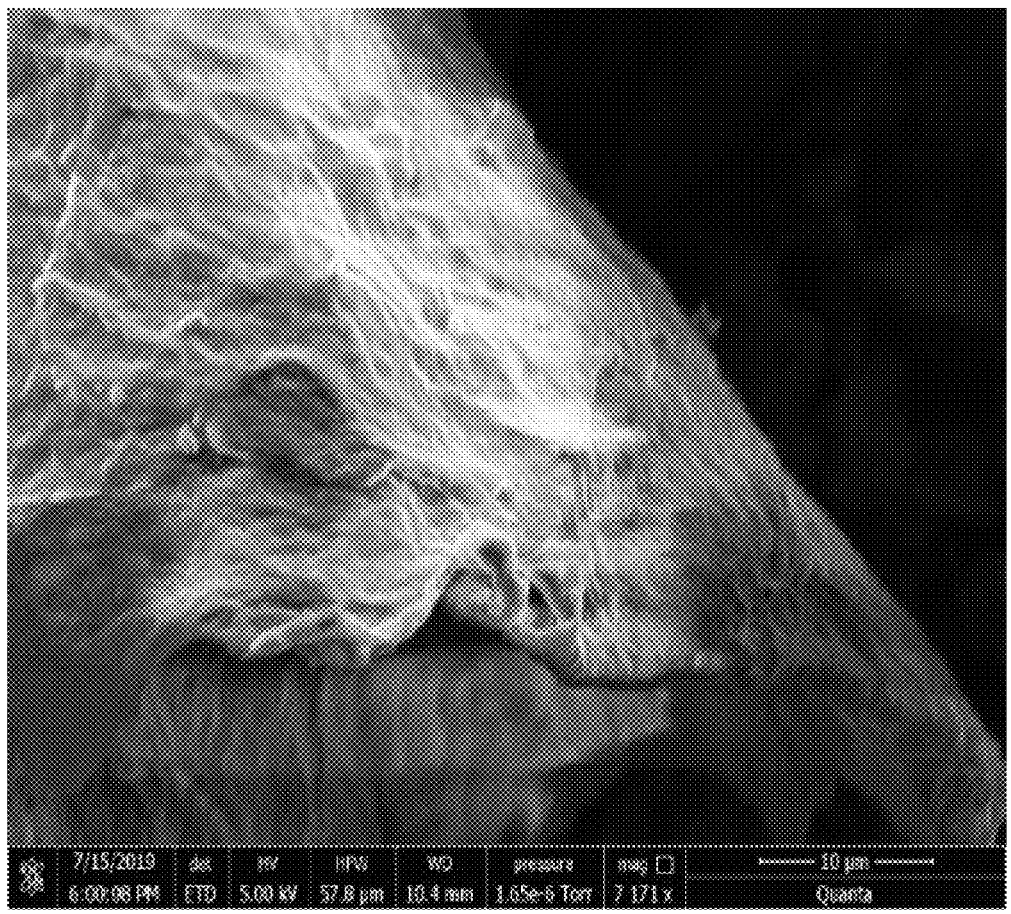
Figure 10C:
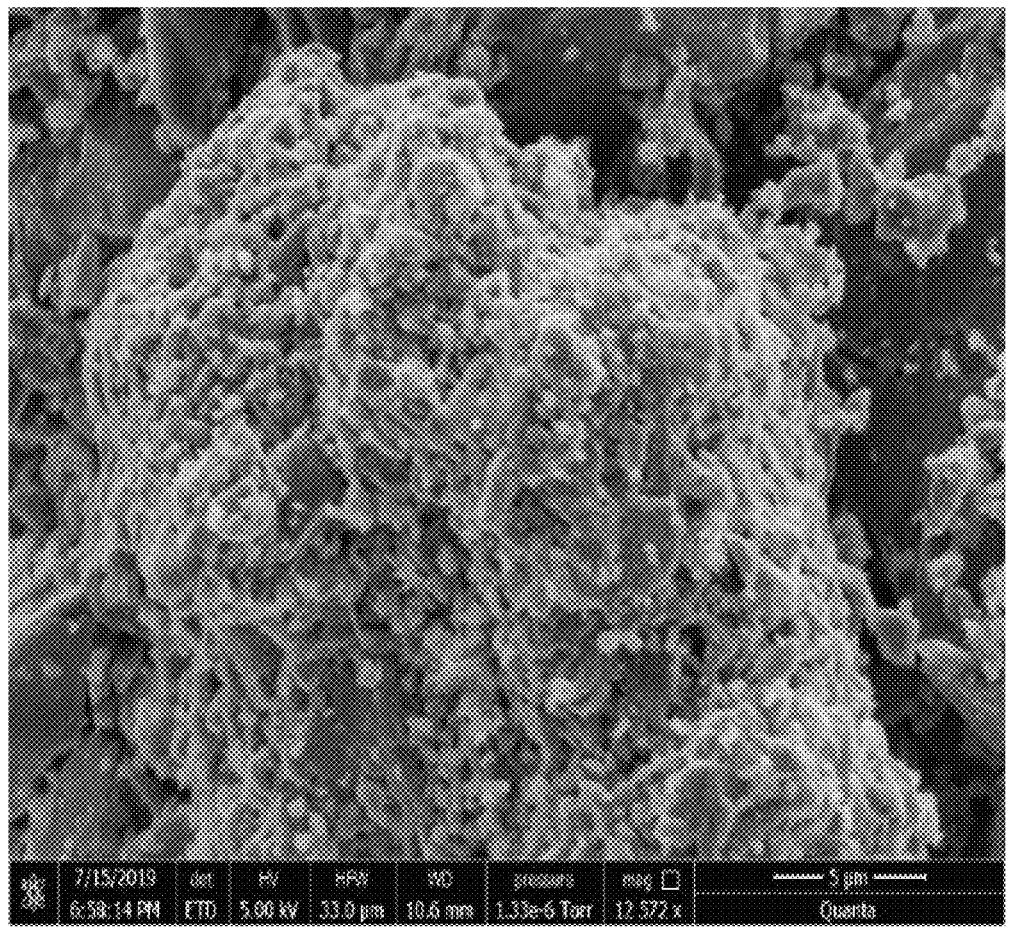

The GO samples were analyzed in powder form and by spray-coating a GO solution, both water-based and DMF-based, in quartz glasses. Both the quartz tube and the powder were carbon coated and then gold-coated to improve the conductivity and facilitate the imaging. Copper tape was used as well to ground the sample. The images were taken at very low KV and small beam spot, generally being 3-5 kv and spot size 2 or 3. FIGS. 10A-C show SEM of GO synthesized from coal char using improved (FIG. 10A) and modified Hummers' (FIG. 10B) and the inventive $HNO_3$ method (FIG. 10C).

TEM

To prepare the solution, 80 mg of GO was first ultrasonicated in 140 mL water. Ultrapure water was used to prepare the dispersions. Beakers used were washed with soap, acid solution, ultrapure water, acetone, and oven dried. The sample was then decanted for 2 hours and the solution that remained dispersed was separated from the graphene oxide that deposited at the bottom. The supernatant solution was placed in a bath sonicator for 30 min and then drop casted on the TEM grids.

UV-VIS

Figure 11:
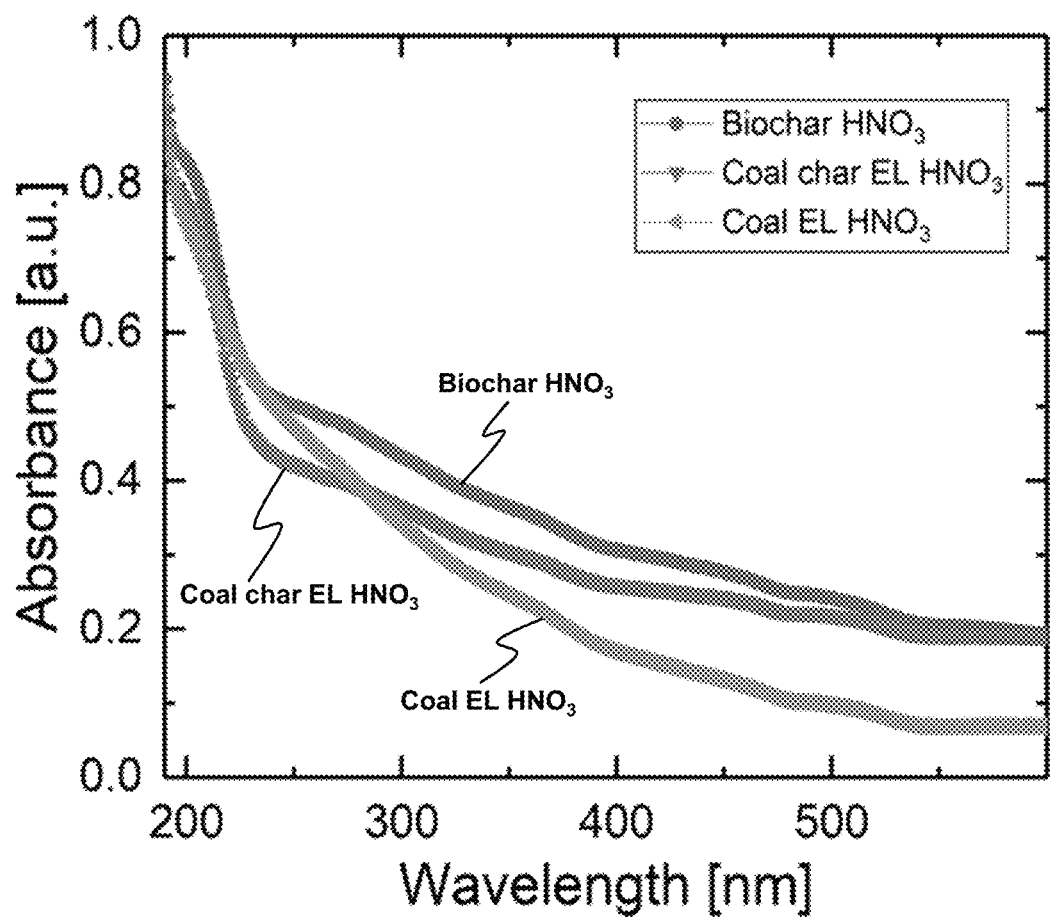
FIG. 11 shows UV-VIS spectra of biochar, coal extract leftover (EL) and coal EL char oxidized using the $HNO_3$ method of the present disclosure.

The same solution used to prepare the TEM grids was used for UV-Vis analysis. A UV-quartz cuvette, having a transmission range of 190-2,500 nm, was used. FIG. 11 shows UV-VIS spectra of biochar, coal extract leftover (EL) and coal EL char oxidized using the $HNO_3$ method. Similar to coal and coal char GO, the coal EL GO show a higher degree of oxidation compared to both coal char and biochar GO.

FTIR

To prepare the sample, first, KBr in a glass container was placed in the oven for 10-30 minutes to dehydrate. The GO sample was then mixed with the KBr starting with a KBr/sample ratio of 500:1 and ground with a mortar and pestle. The ground sample was then placed in a 7 mm KBr pellet die and hydraulically pressed for approximately 2 minutes to form a transparent film to be further analyzed in the KBr-FTIR set-up.

AFM

The solution was prepared following the same routine used by TEM and was drop casted and spin coated on Si-wafers. The Si-wafers are prepared by using a highly oxidative piranha solution (a mixture of $H_2SO_4$ and $H_2O_2$) to remove metals and organic contamination as well as changing the wettability of the surface. Different $H_2SO_4$:$H_2O_2$ ratios varying from 3:1 to 7:1 were used. The mixture was prepared by slowly adding the peroxide to the acid. The mixture heats up rapidly and was used at 200° C. The Si-wafers were added to the piranha solution and left to react for 30 min prior to application of the coating technique. After coating, the sample was cured at 80° C. for 2 days.

Results and Discussion

Scanning Electron, Atomic Force and Transmission Electron Microscopy

FIG. 1 shows the distribution of GO that was spray-coated on quartz at 6000× magnification. From the micrograph, the coal GO has granular morphology and is scattered over layered surfaces. The particles are on average a few microns in size. Similar particles are seen in coal char GO but are much more agglomerated into larger particles with less layered surfaces, as shown in FIG. 10C. The agglomeration may be a result of the charring of the coal. The energy dispersive X-ray (EDX) analysis shows the oxygen-to-coal ratios are 0.76 and 0.65 for the coal and coal char GOs, respectively. This indicates a higher oxygen content for coal GO, which is consistent with expectations.

Figure 2:
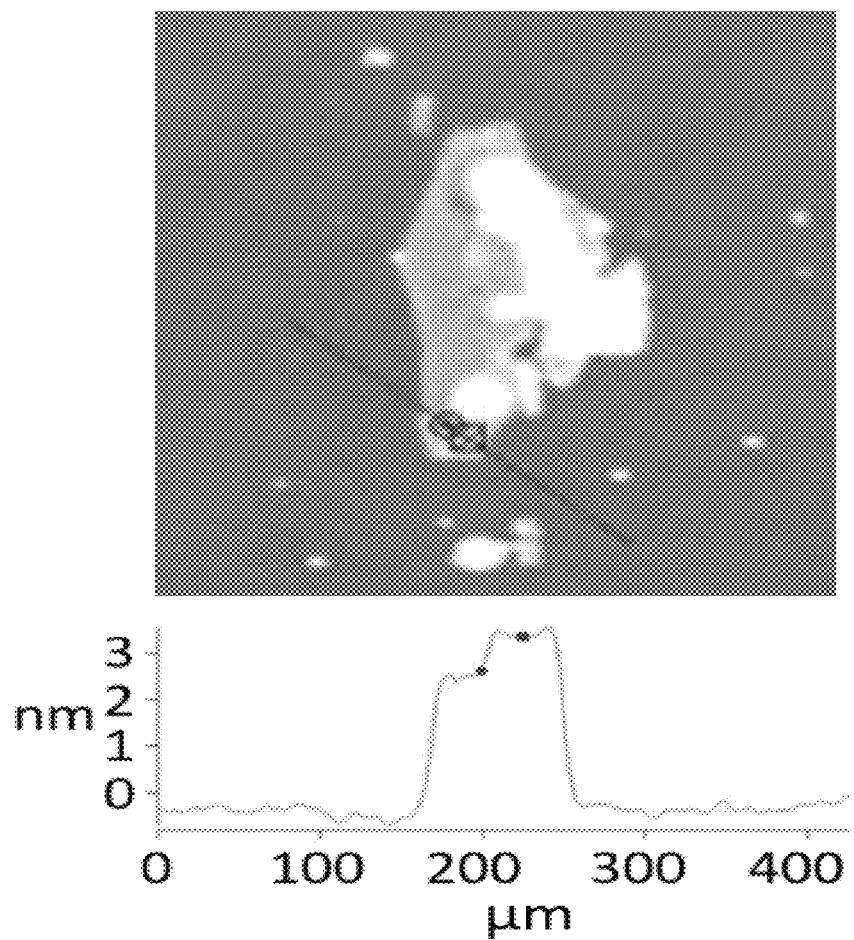
FIG. 2 is a AFM micrograph showing the GO flakes differ about a nanometer in height.
Figure 3:
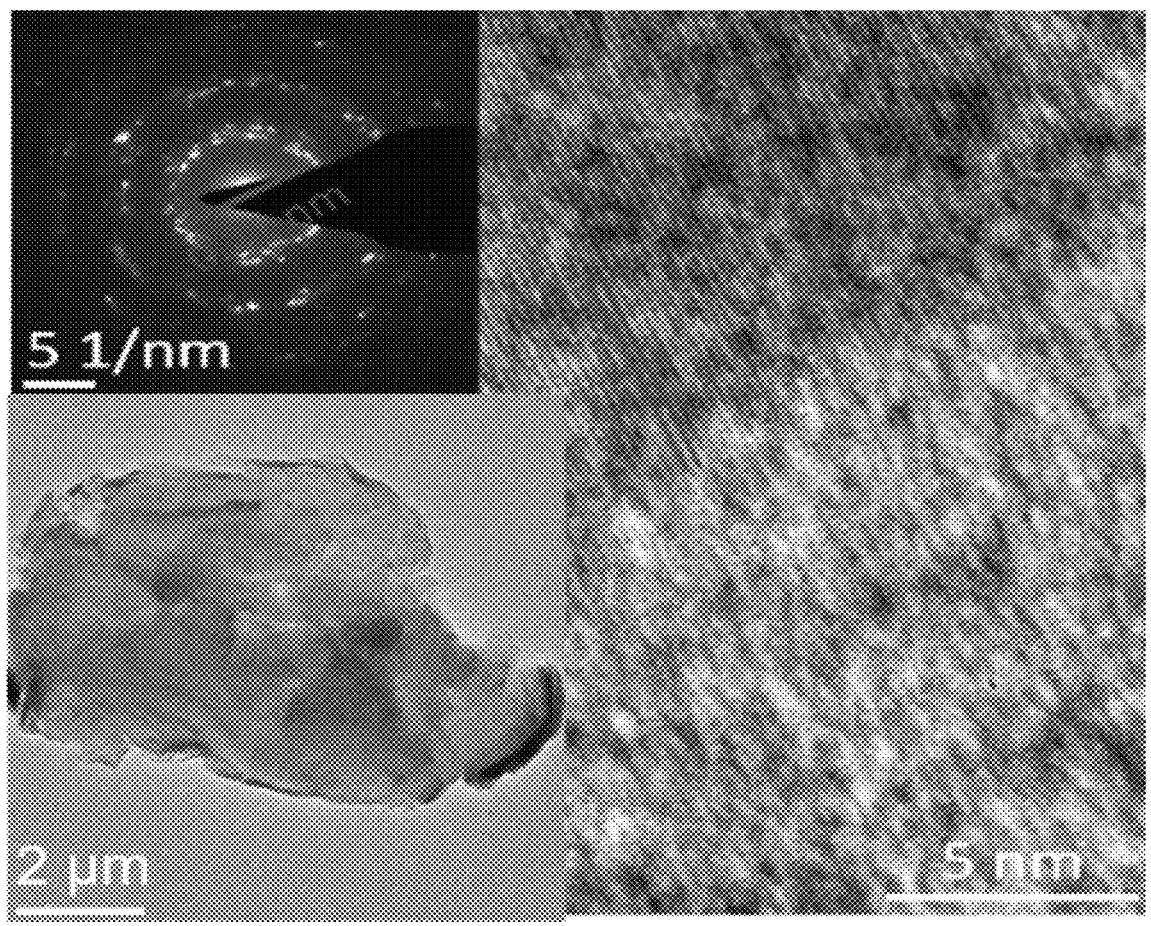
FIG. 3 is a TEM micrograph showing disordered rings suggesting polycrystalline GO structures with a lattice spacing 0.21 nm apart, corresponding to the lattice fringe of graphene.

The atomic force micrograph (AFM) in FIG. 2 shows that these flakes overlap on top of one another about a nanometer in height. The significant increase in interlayer spacing, when graphite is oxidized to graphene oxide, made apparent by the XRD patterns, may be due to hydrophilic oxidation groups which intercalate the graphene layers by attracting water molecules [56]. Alternatively, the large interlayer spacing of graphene oxide may be due to hydroxyl groups decorating the graphene oxide, regardless of the content of water molecules between layers [57]. In addition, speckles or dots were sometimes observed, suggesting that the nitric acid method might have created some graphene oxide quantum dots (GOQD).

Selected area electron diffraction (SAED) from the transmission electron microscopy (TEM) show disordered rings that suggest polycrystalline GO structures. These structures are observed in the actual micrograph as lattice spacing 0.21 nm apart, corresponding to the lattice fringe of graphene [58-60]. This lattice spacing has been interpreted by other groups as indicating GOQD [1-2]. Our lattice fringes, however, were observed on larger flakes. Thus, it is believed the nitric acid method of the present invention does not result in GOQDs.

Figure 4:
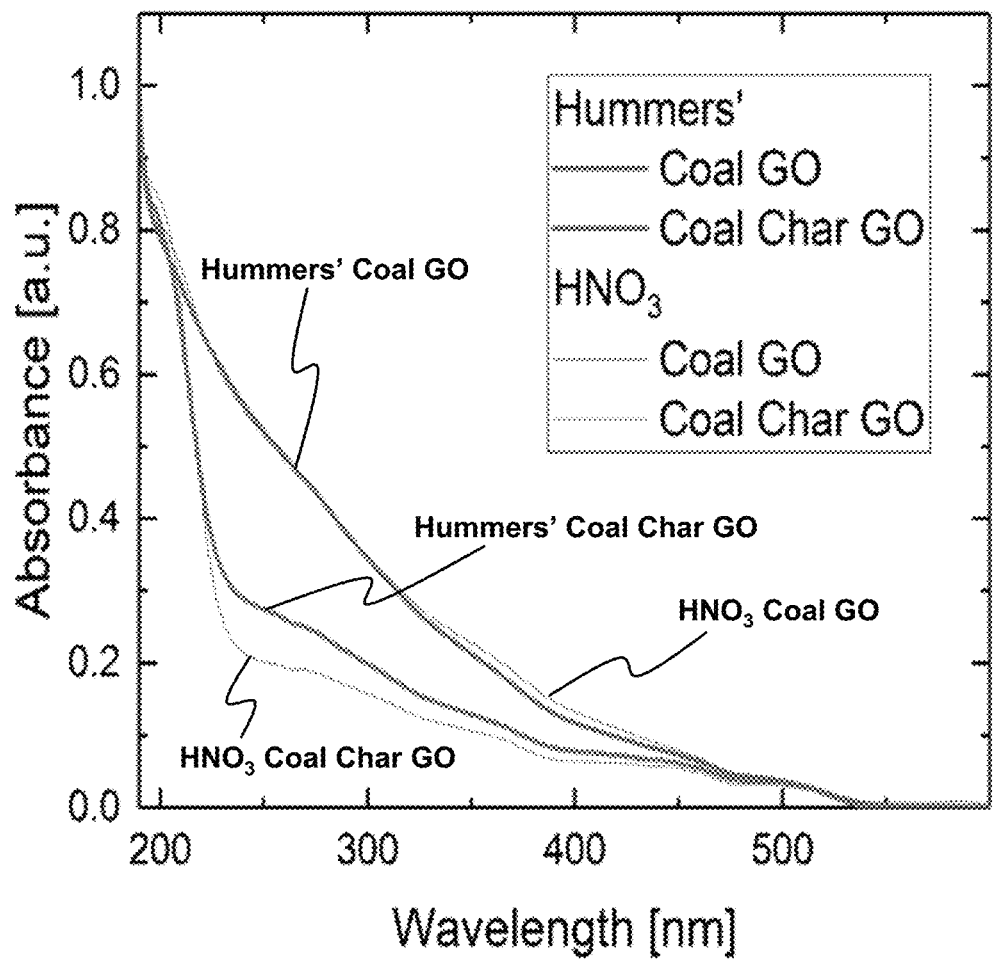
FIG. 4 shows UV-VIS spectra for coal and coal char oxidized using the Hummers' and the $HNO_3$ method of the present disclosure.

FIGS. 10A-C show micrographs of coal GO. FIG. 10A shows a SEM micrograph of coal GO with granular morphology that is scattered over layered surfaces. FIG. 10B shows a AFM micrograph where the GO flakes differ by about a nanometer in height. FIG. 10C shows a TEM micrograph showing disordered rings suggesting polycrystalline GO structures with a lattice spacing 0.21 nm apart, corresponding to the lattice fringe of graphene UV-VIS Spectroscopy FIG. 4 shows UV-VIS for coal and coal char oxidized using the Hummers' and the $HNO_3$ method of the disclosure. As can be seen, coal GO samples show a higher degree of oxidation compared to coal char GO with a broader shoulder between 220 nm to 500 nm. GO synthesized using $HNO_3$ and Hummers' method synthesis show comparable results.

The UV-VIS spectra in FIG. 4 show dominant absorption peaks near 205 nm for both GOs, which have been reported to be $\pi \rightarrow \pi^*$ transitions for the C=C bonding [61]. The coal GO spectrum shows a broader shoulder between 220 nm to 500 nm, which correspond to $n \rightarrow \pi^*$ transitions of oxygen functional groups [39]. This indicates that coal GO samples show a higher degree of oxidation compared to coal char GO. Similar results are observed for the Hummers' GO, which supports our nitric acid method. The larger intensity of the broader peaks confirms the higher oxygen content for coal GO than coal char GO, as reported by other groups [62]. Moreover, such differences in UV-VIS spectra between charred and non-charred samples extend to GO synthesized from coal extract residues (ER) and biochar (see FIG. 11).

Thermogravimetric Analysis

Figure 5:
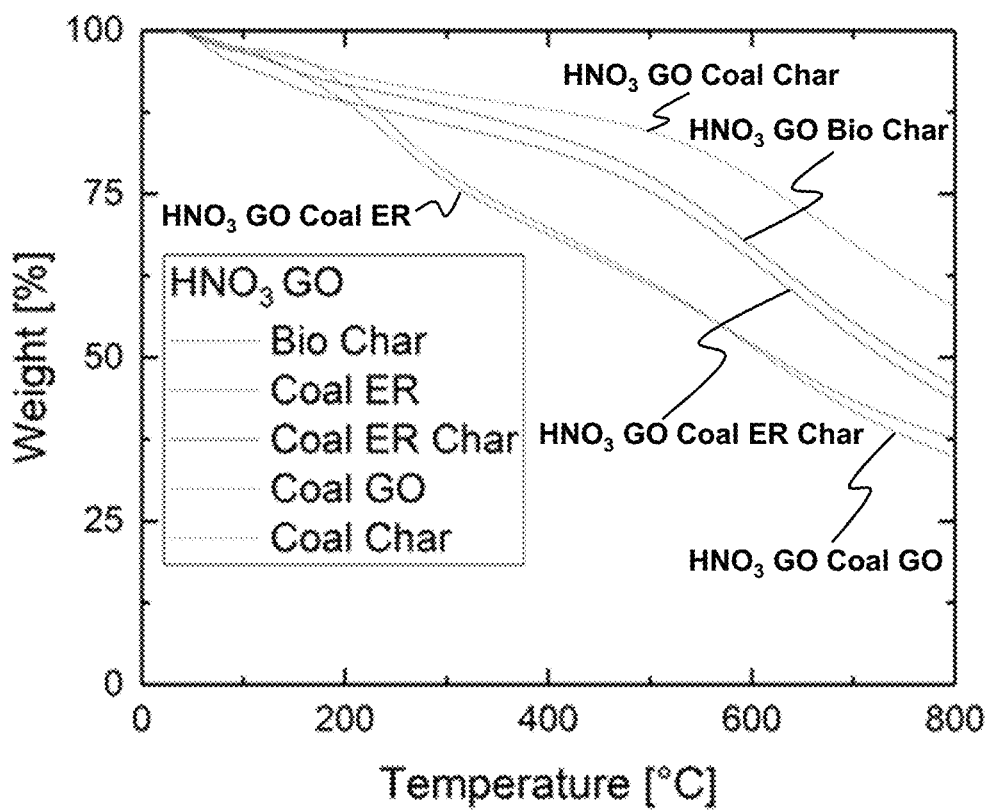
FIG. 5 shows TGA curves for GO derived from various carbon feedstocks using the $HNO_3$ method of the present disclosure.

The TGA curves for GO in FIG. 5 reveal total weight losses of about 60% and 40% for coal GO and coal char GO, respectively. In both cases, a 5% loss is attributed to moisture loss up to 100° C. For coal GO, the first major weight loss at about 200° C. is attributed to the removal of volatile GO functional groups including oxygen groups [63]. In contrast, coal char GO does not contain these volatile groups. The decomposition amounts to the 20% loss difference between the two GOs, which confirms that coal GO has a higher oxygen content than coal char GO. At about 550° C., another slope change indicates some unstable carbon held in the structure forming CO and $CO_2$. After which, the GO samples show stability. Interestingly, the coal extract residues (ER) and coal ER char show similar results to the coal and coal char decompositions, albeit the coal ER char loses about 14% more weight than coal char.

Correlation Between Raman Spectroscopy and Conductivity

Figure 6A:
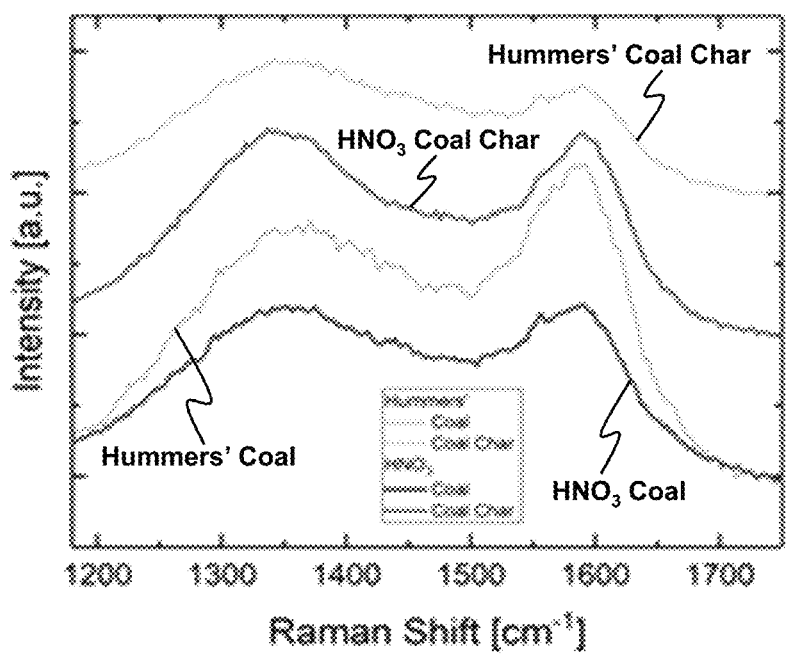
FIGS. 6A-B show Raman spectra of coal-derived GO using the $HNO_3$ method of the present disclosure.

Raman spectroscopy was performed to probe the structural and electronic properties of the graphene oxide (GO) samples as shown in FIG. 6A. For graphitic materials, Raman experiments extract characteristic information such as the defects (D-band), in-plane vibrations of sp2 carbon atoms (G-band) and the stacking order of the carbon basal planes (2D-band) [64]. All the spectra present D- and G-bands centered at ~1350 cm$^{-1}$ and ~1585 cm$^{-1}$ respectively, while no 2D-bands near ~2700 cm$^{-1}$ are present. However, there is a broad feature between the D- and G-bands, which has been reported in Raman analysis of carbon-based materials [22,24,65]. In addition to the D- and G-bands, a D"-band has been fitted near ~1500 cm$^{-1}$. Accordingly, the Raman spectra of coal GO in FIG. 6B have been fitted with three functions: two pseudo-Voigt and a Gaussian profile. Fit parameters for the rest of the Raman spectra of thermally reduced GO can be found in FIGS. 13A-F and Table 1, below. FIGS. 13A-F show Raman spectra with D, G and D" peaks of coal char GO synthesized using the $HNO_3$ method of the present disclosure

TABLE 1

Fit parameters for GO synthesized from coal char using various oxidation methods:

| | D (pseudo Voigt) | | | D" (Gauss) | | | G (pseudo Voigt) | | |
|---|---|---|---|---|---|---|---|---|---|
| T [° C.] | $x_c$ [cm$^{-1}$] | I [%] | W [cm$^{-1}$] | $x_c$ [cm$^{-1}$] | I [%] | W [cm$^{-1}$] | $x_c$ [cm$^{-1}$] | I [%] | W [cm$^{-1}$] |
| HNO$_3$ Method | | | | | | | | | |
| 200 | 1342.1 | 49.4 | 156.4 | 1499.3 | 28.0 | 161.6 | 1589.2 | 22.6 | 80.5 |
| 600 | 1352.1 | 50.8 | 151.5 | 1474.6 | 27.9 | 150.7 | 1592.2 | 21.3 | 75.3 |
| 1000 | 1332.5 | 45.7 | 131.1 | 1483.6 | 27.6 | 156.8 | 1583.4 | 26.7 | 79.2 |
| 1500 | 1331.7 | 54.4 | 99.1 | 1465.3 | 14.5 | 131.7 | 1575.7 | 31.1 | 71.1 |
| 2000 | 1331.5 | 56.2 | 62.8 | 1464.1 | 2.6 | 78.1 | 1567.6 | 41.1 | 65.9 |
| 2500 | 1336.7 | 46.8 | 50.6 | 1450.0 | 8.4 | 99.7 | 1569.0 | 44.8 | 43.7 |
| Modified Hummers' Method | | | | | | | | | |
| 200 | 1334.6 | 39.0 | 135.9 | 1461.6 | 31.4 | 165.0 | 1590.6 | 29.4 | 90.3 |
| 600 | 1341.7 | 46.9 | 143.8 | 1478.7 | 28.3 | 165.0 | 1596.4 | 24.7 | 73.3 |
| 1000 | 1336.8 | 54.7 | 139.5 | 1488.3 | 22.7 | 138.6 | 1584.7 | 15.9 | 77.2 |
| 1500 | 1330.9 | 28.2 | 102.5 | 1464.1 | 39.8 | 165.0 | 1582.8 | 31.8 | 100.1 |
| 2000 | 1332.7 | 54.8 | 62.7 | 1450.0 | 17.9 | 165.0 | 1573.4 | 27.1 | 62.5 |
| 2500 | 1334.4 | 47.2 | 54.5 | 1450.0 | 5.2 | 71.2 | 1566.8 | 47.5 | 43.2 |
| Improved Hummers' Method | | | | | | | | | |
| 200 | 1327.4 | 31.8 | 139.4 | 1450.0 | 41.3 | 165.0 | 1590.4 | 26.7 | 83.5 |
| 600 | 1351.2 | 61.0 | 173.6 | 1500.0 | 12.2 | 154.8 | 1594.9 | 26.6 | 70.8 |
| 1000 | 1332.3 | 50.1 | 142.6 | 1477.5 | 21.1 | 165.0 | 1582.8 | 28.7 | 87.3 |
| 1500 | 1331.3 | 53.9 | 95.8 | 1496.7 | 15.3 | 165.0 | 1573.8 | 30.6 | 68.6 |
| 2000 | 1341.0 | 35.3 | 56.1 | 1453.7 | 3.3 | 74.6 | 1572.3 | 61.3 | 32.2 |
| 2500 | 1347.9 | 13.7 | 45.4 | 1450.0 | 1.7 | 81.2 | 1575.4 | 84.5 | 24.8 |

The ratio of the Raman peak intensity between the D- and G-bands is a common measure of the number of defects and oxygen content after the oxidation process; labelled D/G ratio here. To note, the peak height intensity is chosen instead of the integral peak area since the values do not differ when the average distances between the defects in the samples discussed below are LD>4 nm [15].

The D/G ratio for GO synthesized from various carbon samples are shown in Table 2. The D/G ratio for coal char is slightly higher than that for coal, which suggests higher defects in coal char samples. Moreover, the broad D-band for all samples shows that the lattice is distorted with high concentrations of sp3-like defects [66]. In calculating the average distance between defects [67], assuming comparable coefficient C(λ) for our slightly different λ (532 nm), an average distance between defects LD≈10 nm for the samples is estimated. Similar results are observed for coal and coal char that is oxidized using Hummers' method. This is unexpected as the annealing of amorphous carbon [68], graphite [69] and graphene [70] should generate larger long-range sp2 clusters that increases G-band intensity. On the other hand, Tan et al. attribute the increase in D/G ratio to coal depolymerization that break intermolecular bonds, which results to more disordering in coal chars [33]. This is also in agreement with Keller et al., who annealed highly volatile bituminous coal and anthracites and found that the D/G ratios increase with a reduction in aliphatics and sp2 carbon disordering [32].

The Raman results for Hummers' GO reveal a more prominent increase in the D/G ratios when coal is annealed into coal char. However, both coal ER and coal char ER show significantly higher defects when synthesized using Hummers' as compared to the HNO$_3$ method. We believe that the latter may be a more appropriate route to synthesize GO from coal.

Figure 6B:
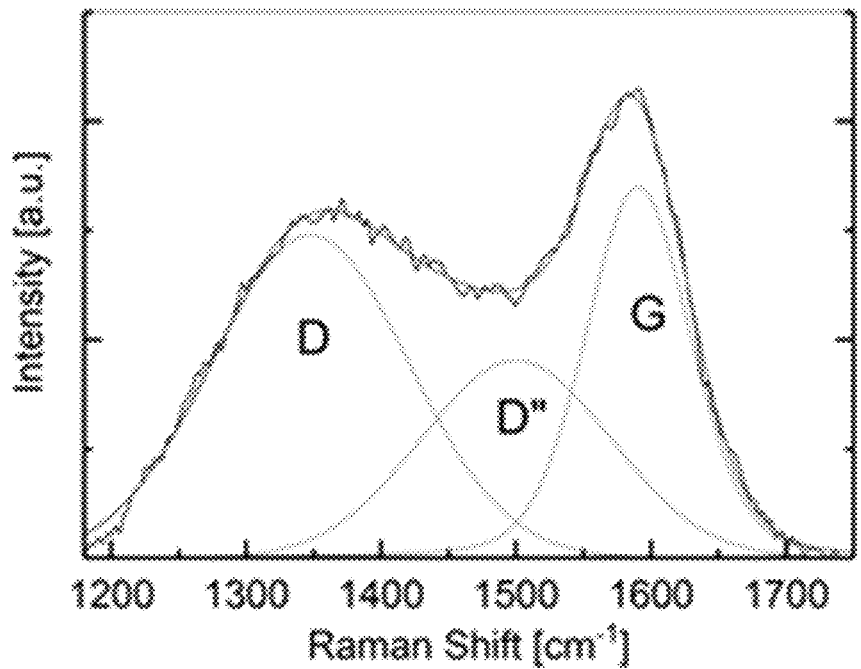

FIGS. 6A-B show Raman spectra of the coal-derived GO. FIG. 6A shows Raman results of coal and coal char oxidized into GO using the Hummers' and HNO$_3$ method. FIG. 6B shows an example of the Raman spectrum for coal Hummers' GO fitted with two pseudo-Voigt (D- and G-bands) and one Gaussian profile (D"-band)

TABLE 2

D/G ratios of GO synthesized from various carbon feedstock using HNO$_3$ and Hummers' method:

| | Coal | Coal char | Coal ER | Coal ER char | Bio char |
|---|---|---|---|---|---|
| HNO$_3$ | 0.97 | 1.06 | 0.96 | 0.99 | 0.88 |
| Hummers' | 0.79 | 1.01 | 1.28 | 1.49 | 1.04 |

Figure 7:
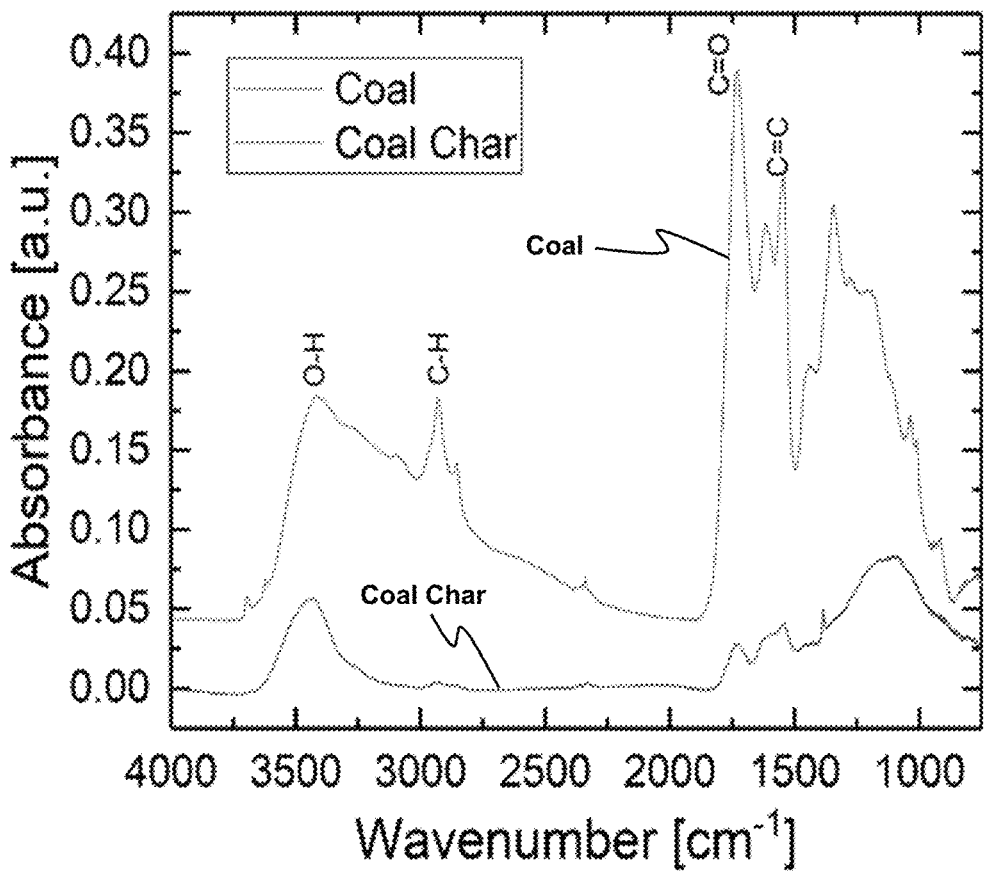
FIG. 7 shows FTIR spectra of coal and coal char oxidized into GO using the $HNO_3$ method of the present disclosure.

FIG. 7 shows FTIR spectra of coal and coal char oxidized into GO using the HNO$_3$ method. Coal char GO has significantly less oxygen content, in particular the stretching vibration of carbonyl C=O at about 1730 cm$^{-1}$.

The increase in D/G ratio may also be attributed to the oxygen content in GO. The oxygen functional groups typically found in GO are hydroxyl, epoxide, carbonyl and carboxyl [70]. DFT calculations have shown that the D/G ratios depend strongly on the local structure of these groups [71]. The oxygen content in coal and coal char that was oxidized using HNO$_3$ is shown in the Fourier-Transform Infrared (FTIR) spectra in FIG. 5. The broad peak between 3000 cm$^{-1}$ and 3600 cm$^{-1}$, which is present for both GO types, is attributed to stretching vibration signals associated with hydroxyl groups. The stretching vibration of carbonyl C=O is seen at about 1730 cm$^{-1}$. Evidence for sp2 bonding between carbon atoms is also seen in both types of samples at about 1540 cm$^{-1}$. The feature at 1340 cm$^{-1}$ has been attributed to the bending of hydroxyl groups. These results agree with FTIR for other GO samples [72].

In comparison to coal char GO, it is clear that there is a higher oxygen content for GO synthesized from coal. The larger oxygen concentration may limit the sp2-crystals measured in the short range, resulting in a decrease in Raman G-band intensity. Interestingly however, the D/G ratio for coal GO is less than coal char GO. This suggests that the Raman results are predominantly caused by the disordering in coal char GO as compared to the limited short-range sp2-crystals in coal GO. Other groups have found D/G ratios exceeding unity is a common characteristic of reduced GO [73]. This can be understood as such, annealing the GO has removed oxygen groups and leaving defects in-place. The increase of aromatic domain sizes is detrimental with the increase in carbon bond disorder at high temperatures.

Figure 8A:
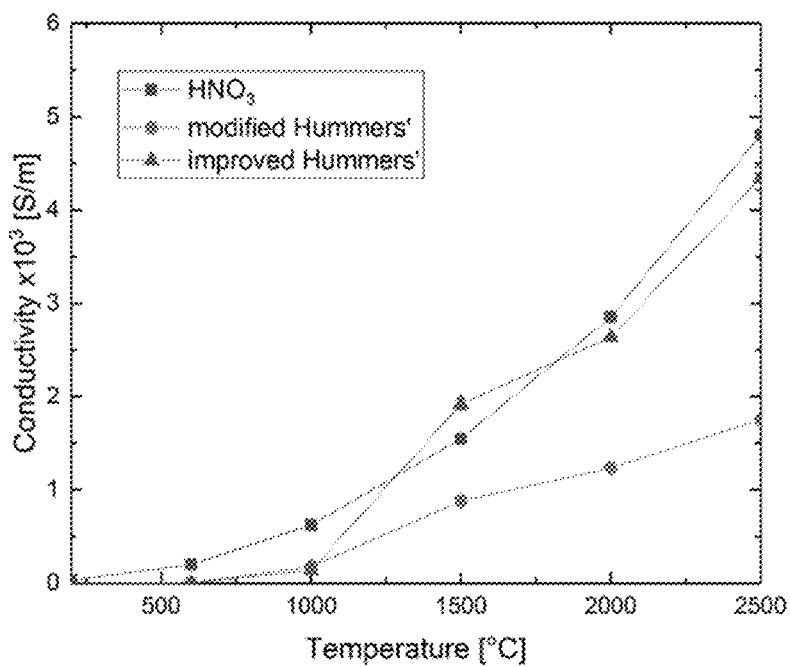
FIGS. 8A-C show conductivity and Raman analysis of coal char GO synthesized using $HNO_3$ of the present disclosure, as well as the modified and improved Hummers' methods.

High-temperature annealing effects of coal char GO was investigated further with respect to Raman and conductivity measurements. In FIG. 8A, the electrical conductivity of powder coal char GO generally increases linearly with annealing temperature from 600° C. and reaches >4000 S/m at 2500° C., that is a factor of two smaller than that for commercial highly ordered pyrolytic graphite. This relative difference between reduced coal char GO and graphite is better than that reported elsewhere [74]. Others report powder conductivities of graphite (~103 S/m) an order larger than graphene (~102 S/m) [36]. The conductivities achieved here are also within the same order (103 S/m) of carbonaceous graphitic powders annealed at 1500° C. [37]. It has to be noted that these conductivities largely depend on the factors such as the height and cross-sectional area of the sampled column, the surface area and pressure applied on the particles, environmental temperature and humidity.

Figure 8B:
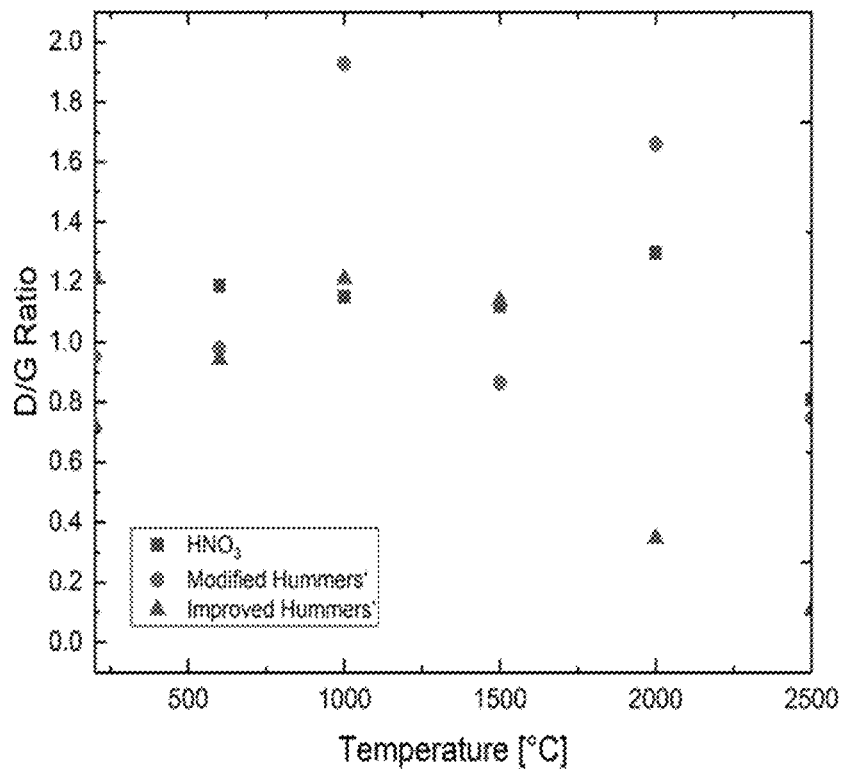

The Raman spectra in FIG. 8B show a general increase of D/G ratio up to 1000° C. with the exception of the $HNO_3$ GO. This is observed in anthracite and bituminous coal [32], in amorphous carbon [68], and in graphite [69] and in graphene [67], and is generally attributed to the increase of the aromatic sp2 domain size. For coal, annealing reduces aliphatic compounds resulting in the localization of the aromatic domains and some disordering, which increases the D-band intensity. The more modest D/G ratio increase up to 600° C. suggests minimal change in the sp2 bonding network. The small decrease in D/G ratio for $HNO_3$ GO may be due to the diverse structures and properties in coal at low annealing temperatures, in which variations the electrical conductivity can vary up to seven orders in magnitude [32].

Figure 12A:
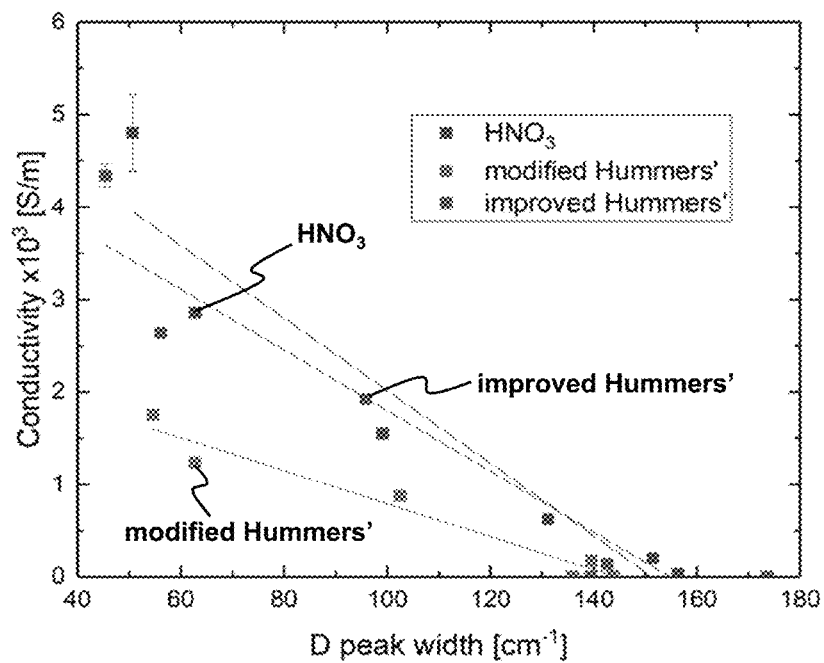
FIG. 12A shows a plot of electrical conductivity vs. D-peak width for GO synthesized from coal char using the improved Hummers', modified Hummers', and $HNO_3$ method of the present disclosure.
Figure 12B:
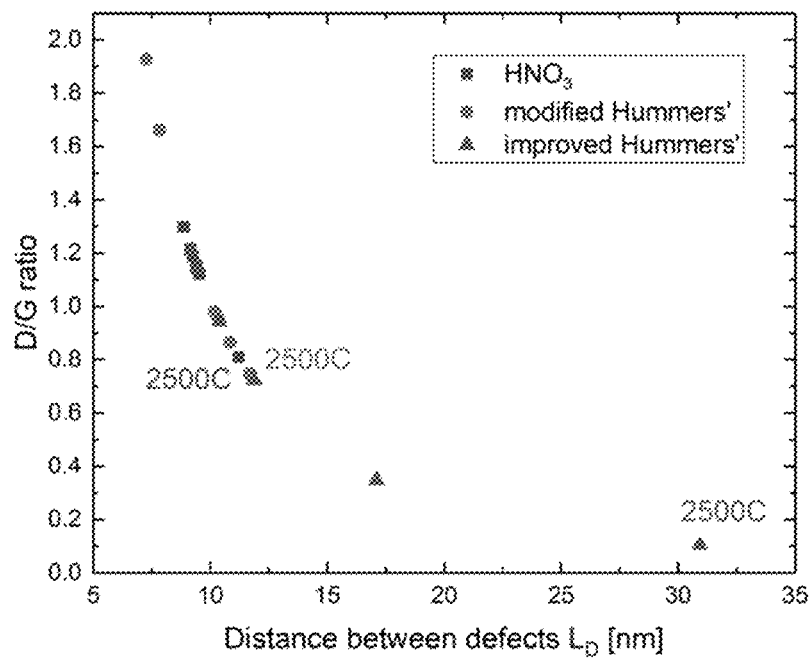
FIG. 12B shows a plot of D/G ratio vs. distance between defects for GO synthesized from coal char using the improved Hummers', modified Hummers', and $HNO_3$ method of the present disclosure.
Figure 13A:
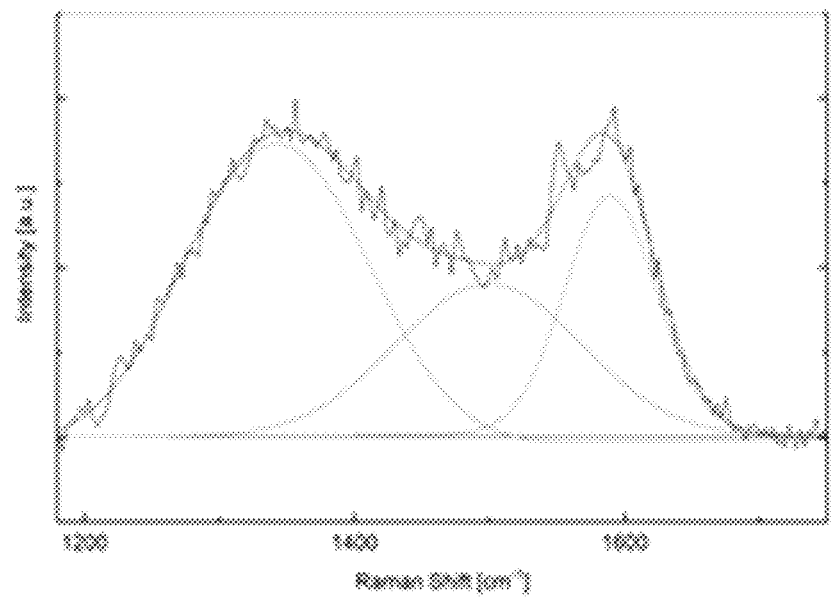
FIG. 13A shows Raman spectra fitted with D, G and D" peaks of coal char GO synthesized using the $HNO_3$ method and annealed at 200° C.
Figure 13B:
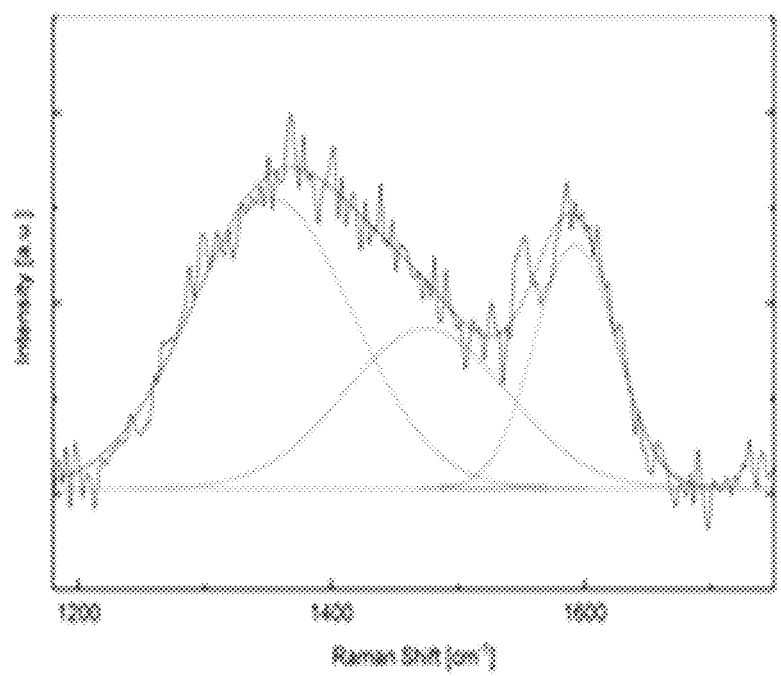
FIG. 13B shows Raman spectra fitted with D, G and D" peaks of coal char GO synthesized using the $HNO_3$ method at and annealed 600° C.
Figure 13C:
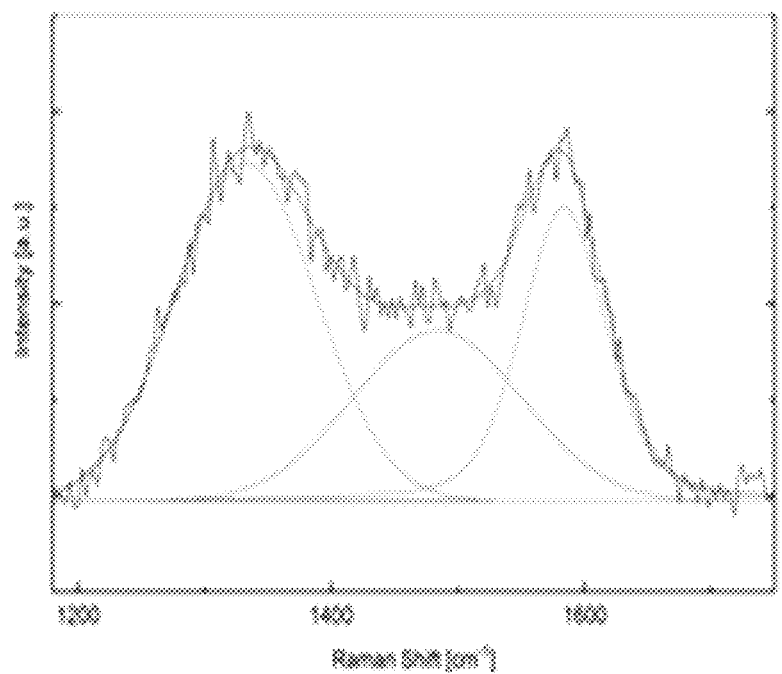
FIG. 13C shows Raman spectra fitted with D, G and D" peaks of coal char GO synthesized using the $HNO_3$ method and annealed at 1000° C.
Figure 13D:
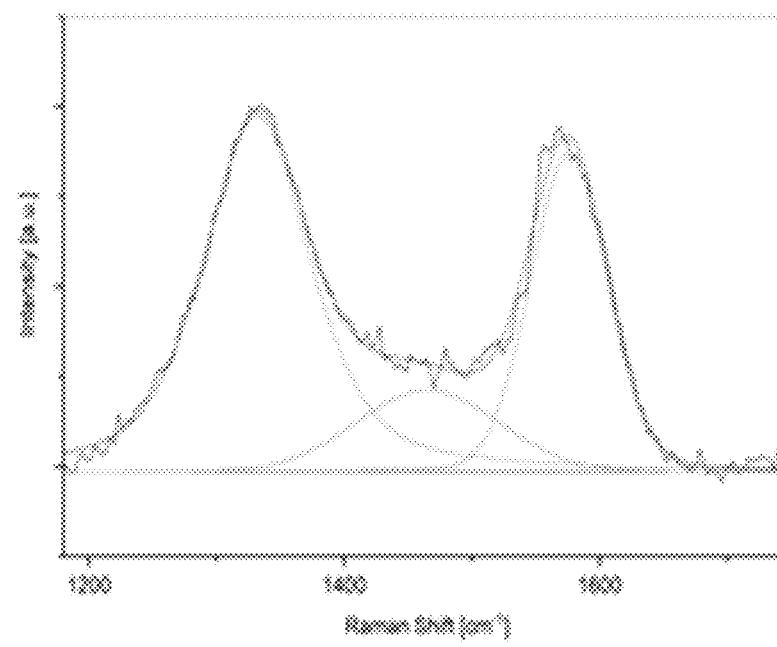
FIG. 13D shows Raman spectra fitted with D, G and D" peaks of coal char GO synthesized using the $HNO_3$ method and annealed at 1500° C.
Figure 13E:
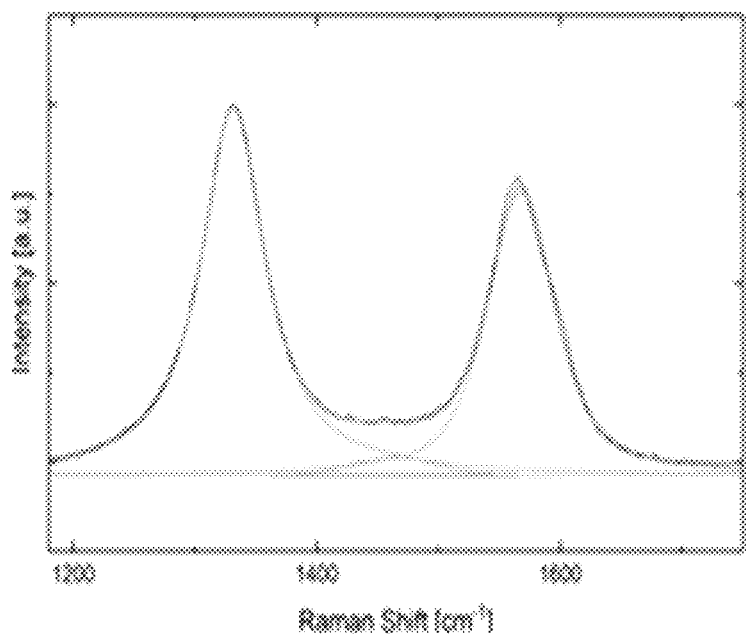
FIG. 13E shows Raman spectra fitted with D, G and D" peaks of coal char GO synthesized using the $HNO_3$ method and annealed at 2000° C.
Figure 13F:
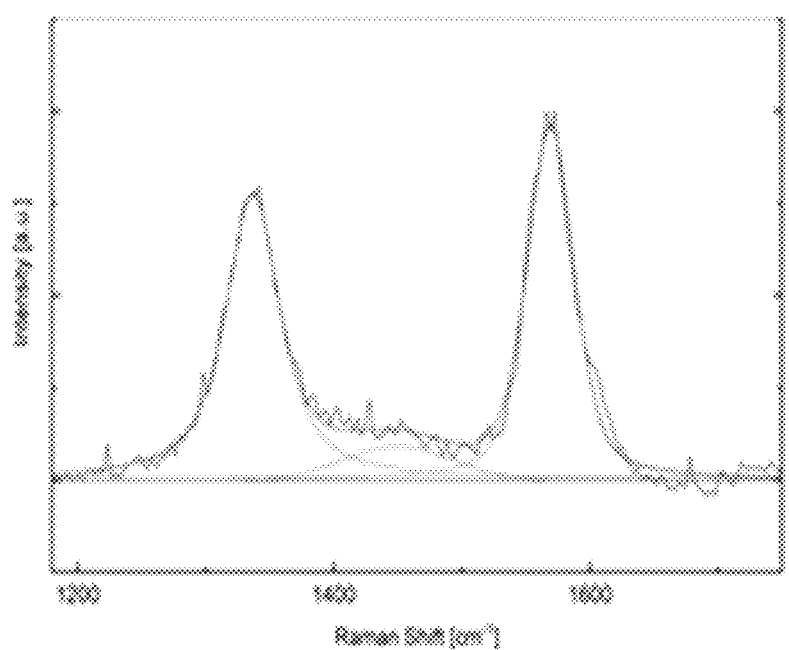
FIG. 13F shows Raman spectra fitted with D, G and D" peaks of coal char GO synthesized using the $HNO_3$ method and annealed at 2500° C.

Above 1000° C., the increase in electrical conductivity for improved Hummers' GO decreases the D/G ratio, as observed by some groups [75] with among the highest electrical conductivity values reported when D/G approaches [30,31,76]. This is well understood as the disordering diminishes and the sp2 clusters are restored with increasing annealing temperatures, which we see as a linear correlation between the increasing electrical conductivity and the diminishing D-peak width (see FIG. 12A). Since the D-band width is described to be proportional to the fraction of carbon atoms which are not sp2-hybridized [19], this linear correlation may be a simple and effective way to characterize the degree of reduction and evaluate the quality of graphene samples. Consequently, the average distance between the defects also increases (see FIG. 12B). In the case of modified Hummers' GO, the decrease of the ratio to D/G=0.74 is commensurate with the electrical conductivity 1750 S/m. However, the electrical conductivity of $HNO_3$ GO is the highest (~4800 S/m) in spite of a measured ratio D/G=0.81, which suggests that the D/G ratio alone may not be a clear indicator of the electrical properties for the reduced GO samples. In fact, EDX analysis that shows a remaining ~3% oxygen content for $HNO_3$ GO, about double that of the other two annealed GOs, does not explain the high electrical conductivity for that sample. Similar observations are made by Liu et al. [77], who rapidly heated graphene oxide using microwaves and found D/G=0.88 and a sharp 2D-band and measured exceptional electrical conductivities.

Figure 8C:
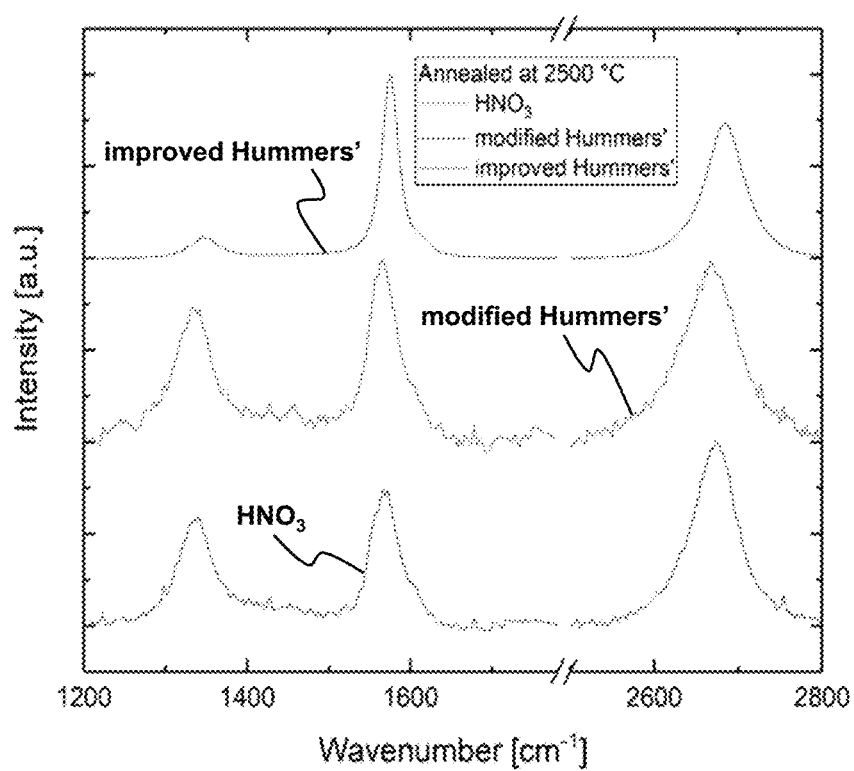

For all three samples, the 2D-band near 2680 $cm^{-1}$ appears after 1500° C. and the 2D/G ratios are largest at 2500° C. in FIG. 8C. The appearance and increase in the 2D-band is due to a double-resonance of a two-phonon scattering process, resulting from decreasing number of defects in graphene [68]. In turn, charge carrier concentration and mobility should improve.

FIGS. 8A-C show conductivity and Raman analysis of coal char GO synthesized using the $HNO_3$ method, and the modified and improved Hummers' method. (A) Conductivity and (B) D/G ratio as a function of temperature. (C) Raman spectra measured at 2500° C. The low D/G ratio corresponds to less defects, larger sp2 domains and increased charged carrier concentration. The low 2D/G ratio for improved Hummers' GO suggests higher charged impurity defects that limits mobility. The rise in electrical conductivity suggests the more charge carriers are created to compensate the carrier mobility restrictions However, a lower 2D/G ratio suggests higher charge impurity concentration that limits charge carrier mobility [78]. Thus, in spite of the reduction in defects for all samples, the carrier mobility in improved Hummers GO is most restricted due to its low 2D/G ratio of 0.74; the $HNO_3$ GO is in contrast the least restricted. Consequently, the 2D/G ratio does not seem to correlate independently with electrical conductivity either, as seen from other groups [79]. The two opposing thermal effects that determine the electrical properties of graphene as derived from the 2D/G and the D/G ratio after elucidating the origins of the contentious D"-band are discussed below.

In order to clarify the utility of the D"-band in the Raman analysis, we look to the interpretations made by Vollebregt et al. regarding the origins of the band [21]. They attributed the D" band to an amorphous phase that decreased in intensity with increasing crystallinity in carbon-based nanomaterials. To illustrate this point, the D"/G ratio is plotted as a function of the La value that corresponds to the crystallinity of annealed GO in FIGS. 9A-C. Above 200° C., the D"/G ratio generally decreases as the crystallinity increases. Furthermore, the D"-band full-width half-maximum (FWHM) scales well with the crystallinity of the thermally reduced GO, in agreement with Vollebregt et al. As this is true for both improved Hummers' and $HNO_3$ GO, the modified Hummers' GO does not show a similar trend. The presence of the D"-band and the decrease of the D-band width seen previously may be understood as sp2 crystals surrounded by a non-diminishing amorphous phase. Additionally, these amorphous phases can act as electrical charge traps that restricts charge mobility, which may explain the lower measured conductivity in contrast to the other two samples.

Without wishing to be bound by theory, it is proposed that the high-temperature annealing effects on the Raman spectra and the electrical characterizations are as follows: on one hand, sp3 domains are reduced to sp2 domains; on the other hand, structural defects are created in-place of deoxygenated sites. The electrical conductivity depends on the charge carrier concentration and mobility of the electrons created following thermal reduction. The charge carrier concentration should increase with the increase of sp2 domains. Simultaneously however, the structural defects impede electron mobility. In addition, the mobility may be further limited by charge traps and charged impurity defects.

Thus, the mechanism of conductivity depends on structural defects and the degree of reduction to aromatic domains. In order to understand further the mechanism of high conductivity of reduced GO in spite of high oxygen content, Ruoff et al. proposed other investigations, such as (i) percolation rates across particle-to-particle interfaces, (ii) cross-linked networks and (iii) charge transfer via ionic channels across the sample [74].

Figure 9A:
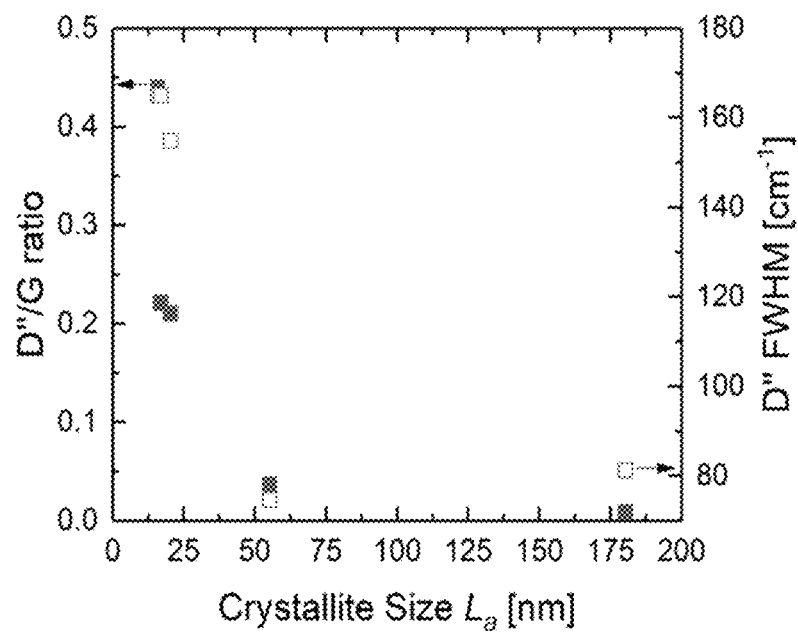
FIG. 9A-C show D"/G ratio as a function of crystallite size and FWHM of the D"-band in improved Hummers' GO, modified Hummers' GO and $HNO_3$ GO of the present disclosure, respectively.
Figure 9B:
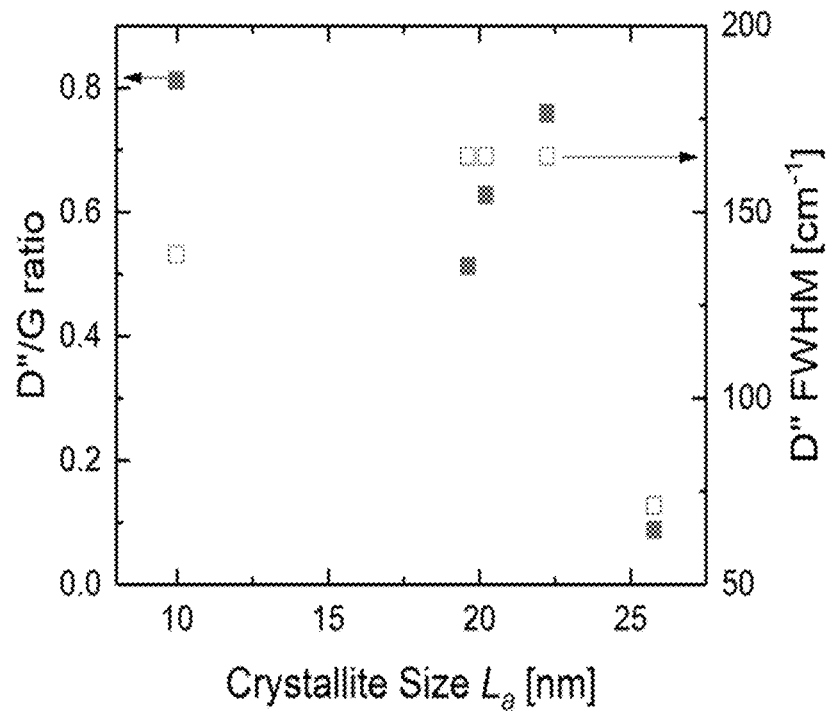
Figure 9C:
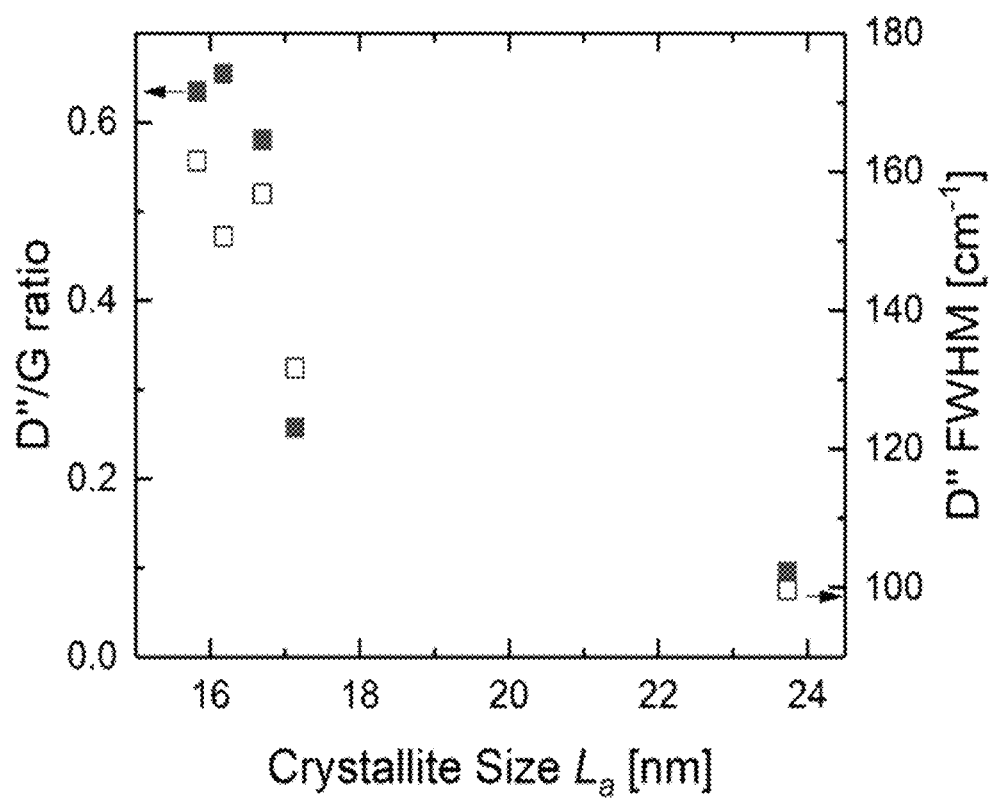

FIGS. 9A-C shows D"/G ratio as a function of crystallite size and FWHM of the D"-band in improved Hummers' GO (FIG. 9A), modified Hummers' GO (FIG. 9B) and inventive $HNO_3$ GO (FIG. 9C). The D"-band corresponds to the amorphous phase, which may act as a charge trap and impede carrier mobility.

Thus, the large varying degree of functional chemistry and molecular compounds in coal results in tunable optical and electronic properties comparable to established sources such as graphite. Moreover, the defects present in coal-based electrodes may be advantageous for ionic adsorption in energy storage applications.

Fourier-Transform Infrared spectra details the bonds between carbon—functional groups present in both coal and coal char graphene oxides. While both materials show hydroxyl groups and the sp2 carbon bonds, only coal graphene oxide presents carbonyl bonds which supports its higher degree of oxidation. Similar observations are found in the Raman analysis, although higher oxygen content did not result in higher ratio of the D/G bands as expected. Although a larger oxygen concentration would reduce sp2 allotropes and hence the D/G ratios, charring the coal also increased the amount of disordering in the graphene oxide material. It is believed that annealing the graphene oxide has removed oxygen groups but also left defects in its place.

The high-temperature anneal up to 2500° C. has increased the electrical conductivity in coal char reduced graphene oxide to ~4800 S m$^{-1}$, which is in the same order of magnitude as that in graphite and in the literature. Furthermore, the nitric acid method yielded the highest conductivity in comparison to both improved and modified Hummers' method although its D/G ratio is closer to unity than to zero. The 2D/G ratio for the nitric acid method was also the highest, however an independent correlation between the electrical conductivity and the D/G or the 2D/G ratios was not found as reported in the prior art. Instead, the D/G, the 2D/G and the D"/G ratios shed insight into how the structural and impurity defects in GO and its degree of thermal reduction may correspond to electrical conductivity.

REFERENCES

[1] Y. Dong, J. Lin, Y. Chen, F. Fu, Y. Chi, G. Chen, Graphene quantum dots, graphene oxide, carbon quantum dots and graphite nanocrystals in coals, Nanoscale. 6 (2014) 7410-7415. doi:10.1039/c4nr01482k.
[2] S. Kang, K. M. Kim, K. Jung, Y. Son, S. Mhin, J. H. Ryu, et al., Graphene Oxide Quantum Dots Derived from Coal for Bioimaging: Facile and Green Approach, Scientific Reports. 9 (2019). doi:10.1038/s41598-018-37479-6.
[3] A. Filina, N. Yousefi, M. Okshevsky, N. Tufenkji, Antimicrobial Hierarchically Porous Graphene Oxide Sponges for Water Treatment, ACS Applied Bio Materials. 2 (2019) 1578-1590. doi:10.1021/acsabm.9b00008.
[4] Y. Lv, B. Xing, M. Zheng, G. Yi, G. Huang, C. Zhang, et al., Hydrothermal Synthesis of Ultra-Light Coal-Based Graphene Oxide Aerogel for Efficient Removal of Dyes from Aqueous Solutions, Nanomaterials. 8 (2018) 670. doi:10.3390/nano8090670.
[5] W. H. Antink, Y. Choi, K.-D. Seong, J. M. Kim, Y. Piao, Recent Progress in Porous Graphene and Reduced Graphene Oxide-Based Nanomaterials for Electrochemical Energy Storage Devices (Adv. Mater. Interfaces 5/2018), Advanced Materials Interfaces. 5 (2018) 1870023. doi: 10.1002/admi.201870023.
[6] Lowe SE, Zhong YL, Challenges of Industrial-Scale Graphene Oxide Production, in: A. M. Dimiev, S. Eigler (Eds.) Graphene Oxide, John Wiley & Sons Ltd, 2016, pp. 410-431.
[7] U.S. Energy Information Administration. Annual Energy Review. https://www.eia.gov/beta/international/. accessed in 2019).
[8] R. Ye, C. Xiang, J. Lin, Z. Peng, K. Huang, Z. Yan, et al., Coal as an abundant source of graphene quantum dots, Nature Communications. 4 (2013). doi:10.1038/ncomms3943.
[9] J. P. Mathews, A. L. Chaffee, The molecular representations of coal— A review, Fuel. 96 (2012) 1-14. doi: 10.1016/j.fuel.2011.11.025.
[10] S. Vasireddy, B. Morreale, A. Cugini, C. Song, J. J. Spivey, Clean liquid fuels from direct coal liquefaction: chemistry, catalysis, technological status and challenges, Energy Environ. Sci. 4 (2011) 311-345. doi:10.1039/c0ee00097c.
[11] U. Sierra, P. Álvarez, C. Blanco, M. Granda, R. Santamaria, R. Menendez, Cokes of different origin as precursors of graphene oxide, Fuel. 166 (2016) 400-403. doi:10.1016/j.fuel.2015.10.112.
[12] L. Fernández-García, P. Álvarez, A. M. Pérez-Mas, C. Blanco, R. Santamariá, R. Menéndez, et al., Peculiarities of the production of graphene oxides with controlled properties from industrial coal liquids, Fuel. 203 (2017) 253-260. doi:10.1016/j.fuel.2017.04.130.
[13] D. Savitskii, Preparation and characterization of colloidal dispersions of graphene-like structures from different ranks of coals, Journal of Fuel Chemistry and Technology. 45 (2017) 897-907. doi:10.1016/s1872-5813(17)30043-9.
[14] B. Pakhira, S. Ghosh, S. Maity, D. N. Sangeetha, A. Laha, A. Allam, et al., Extraction of preformed graphene oxide from coal: its clenched first form entrapping large molecules, RSC Advances. 5 (2015) 89076-89082. doi: 10.1039/c5ra15699h.
[15] A. Jorio, E. H. M. Ferreira, M. V. O. Moutinho, F. Stavale, C. A. Achete, R. B. Capaz, Measuring disorder in graphene with the G and D bands, Physica Status Solidi (b). 247 (2010) 2980-2982. doi:10.1002/pssb.201000247.
[16] S. Reich, C. Thomsen, Raman spectroscopy of graphite, Philosophical Transactions of the Royal Society of London. Series A: Mathematical, Physical and Engineering Sciences. 362 (2004) 2271-2288. doi:10.1098/rsta.2004.1454.
[17] L. G. Cançado, A. Jorio, E. H. M. Ferreira, F. Stavale, C. A. Achete, R. B. Capaz, et al., Quantifying Defects in Graphene via Raman Spectroscopy at Different Excitation Energies, Nano Letters. 11 (2011) 3190-3196. doi: 10.1021/nl201432g.
[18] B. Martín-García, M. M. Velázquez, F. Rossella, V. Bellani, E. Diez, J. L. G. Fierro, et al., Functionalization of Reduced Graphite Oxide Sheets with a Zwitterionic Surfactant, ChemPhysChem. 13 (2012) 3682-3690. doi: 10.1002/cphc.201200501.
[19] X. Diez-Betriu, S. Álvarez-García, C. Botas, P. Alvarez, J. Sanchez-Marcos, C. Prieto, et al., Raman spectroscopy for the study of reduction mechanisms and optimization of conductivity in graphene oxide thin films, Journal of Materials Chemistry C. 1 (2013) 6905. doi:10.1039/c3tc31124d.

[20] R. J. Nemanich, S. A. Solin, First- and second-order Raman scattering from finite-size crystals of graphite, Physical Review B. 20 (1979) 392-401. doi:10.1103/physrevb.20.392.

[21] S. Vollebregt, R. Ishihara, F. Tichelaar, Y. Hou, C. Beenakker, Influence of the growth temperature on the first and second-order Raman band ratios and widths of carbon nanotubes and fibers, Carbon. 50 (2012) 3542-3554. doi:10.1016/j.carbon.2012.03.026.

[22] A. Sadezky, H. Muckenhuber, H. Grothe, R. Niessner, U. Pöschl, Raman microspectroscopy of soot and related carbonaceous materials: Spectral analysis and structural information, Carbon. 43 (2005) 1731-1742. doi:10.1016/j.carbon.2005.02.018.

[23] T. Jawhari, A. Roid, J. Casado, Raman spectroscopic characterization of some commercially available carbon black materials, Carbon. 33 (1995) 1561-1565. doi:10.1016/0008-6223(95)00117-v.

[24] R. Saito, M. Hofmann, G. Dresselhaus, A. Jorio, M. S. Dresselhaus, Raman spectroscopy of graphene and carbon nanotubes, Advances in Physics. 60 (2011) 413-550. doi:10.1080/00018732.2011.582251.

[25] H. A. Becerril, J. Mao, Z. Liu, R. M. Stoltenberg, Z. Bao, Y. Chen, Evaluation of Solution-Processed Reduced Graphene Oxide Films as Transparent Conductors, ACS Nano. 2 (2008) 463-470. doi:10.1021/nn700375n.

[26] C. Vallés, J. D. Núñez, A. M. Benito, W. K. Maser, Flexible conductive graphene paper obtained by direct and gentle annealing of graphene oxide paper, Carbon. 50 (2012) 835-844. doi:10.1016/j.carbon.2011.09.042.

[27] C.-H. Huang, Y.-Y. Wang, T.-H. Lu, Y.-C. Li, Flexible Transparent Electrode of Hybrid Ag-Nanowire/Reduced-Graphene-Oxide Thin Film on PET Substrate Prepared Using $H_2$/Ar Low-Damage Plasma, Polymers. 9 (2017) 28. doi:10.3390/polym9010028.

[28] Z.-S. Wu, W. Ren, L. Gao, J. Zhao, Z. Chen, B. Liu, et al., Synthesis of Graphene Sheets with High Electrical Conductivity and Good Thermal Stability by Hydrogen Arc Discharge Exfoliation, ACS Nano. 3 (2009) 411-417. doi:10.1021/nn900020u.

[29] Y. Wu, Y. Ma, Y. Wang, L. Huang, N. Li, T. Zhang, et al., Efficient and Large Scale Synthesis of Graphene from Coal and Its Film Electrical Properties Studies, Journal of Nanoscience and Nanotechnology. 13 (2013) 929-932. doi:10.1166/jnn.2013.6001.

[30] Y. Chen, K. Fu, S. Zhu, W. Luo, Y. Wang, Y. Li, et al., Reduced Graphene Oxide Films with Ultrahigh Conductivity as Li-Ion Battery Current Collectors, Nano Letters. 16 (2016) 3616-3623. doi:10.1021/acs.nanolett.6b00743.

[31] H. Chen, F. Guo, Y. Liu, T. Huang, B. Zheng, N. Ananth, et al., A Defect-Free Principle for Advanced Graphene Cathode of Aluminum-Ion Battery, Advanced Materials. 29 (2017) 1605958. doi:10.1002/adma.201605958.

[32] B. D. Keller, N. Ferralis, J. C. Grossman, Rethinking Coal: Thin Films of Solution Processed Natural Carbon Nanoparticles for Electronic Devices, Nano Letters. 16 (2016) 2951-2957. doi:10.1021/acs.nanolett.5b04735.

[33] S. Tan, T. J. Kraus, K. D. Li-Oakey, Understanding the supercapacitor properties of electrospun carbon nanofibers from Powder River Basin coal, Fuel. 245 (2019) 148-159. doi:10.1016/j.fuel.2019.01.141.

[34] W. Ma, S. Chen, S. Yang, W. Chen, W. Weng, M. Zhu, Bottom-Up Fabrication of Activated Carbon Fiber for All-Solid-State Supercapacitor with Excellent Electrochemical Performance, ACS Applied Materials & Interfaces. 8 (2016) 14622-14627. doi:10.1021/acsami.6b04026.

[35] E. Tkalya, M. Ghislandi, A. Alekseev, C. Koning, J. Loos, Latex-based concept for the preparation of graphene-based polymer nanocomposites, Journal of Materials Chemistry. 20 (2010) 3035. doi:10.1039/b922604d.

[36] B. Marinho, M. Ghislandi, E. Tkalya, C. E. Koning, G. D. With, Electrical conductivity of compacts of graphene, multi-wall carbon nanotubes, carbon black, and graphite powder, Powder Technology. 221 (2012) 351-358. doi:10.1016/j.powtec.2012.01.024.

[37] S. Pérez-Rodríguez, D. Torres, M. Lázaro, Effect of oxygen and structural properties on the electrical conductivity of powders of nanostructured carbon materials, Powder Technology. 340 (2018) 380-388. doi:10.1016/j.powtec.2018.09.038.

[38] H. Dindi, X.-H. Bai, W. B. Krantz, Thermal and electrical property measurements for coal, Fuel. 68 (1989) 185-192. doi:10.1016/0016-2361(89)90321-9.

[39] E. S. Kumar, V. Sivasankar, R. Sureshbabu, S. Raghu, R. A. Kalaivani, Facile synthesis of few layer graphene from bituminous coal and its application towards electrochemical sensing of caffeine, Advanced Materials Letters. 8 (2017) 239-245. doi:10.5185/amlett.2017.7048.

[40] Celzard A, Marêché JF, Payot F, Furdin G, Electrical conductivity of carbonaceous powders, Carbon 2002; 40(15):2801-2815.

[41] D. C. Marcano, D. V. Kosynkin, J. M. Berlin, A. Sinitskii, Z. Sun, A. Slesarev, et al., Improved Synthesis of Graphene Oxide, ACS Nano. 4 (2010) 4806-4814. doi:10.1021/nn1006368.

[42] W. Chen, G. Lv, W. Hu, D. Li, S. Chen, Z. Dai, Synthesis and applications of graphene quantum dots: a review, Nanotechnology Reviews. 7 (2018) 157-185. doi:10.1515/ntrev-2017-0199.

[43] N. E. Sorokina, N. V. Maksimova, V. V. Avdeev, Inorganic Materials. 37 (2001) 360-365. doi:10.1023/a:1017575710886.

[44] M. P. Araújo, O. S. G. P. Soares, A. J. S. Fernandes, M. F. R. Pereira, C. Freire, Tuning the surface chemistry of graphene flakes: new strategies for selective oxidation, RSC Advances. 7 (2017) 14290-14301. doi:10.1039/c6ra28868e.

[45] M. Rosillo-Lopez, C. G. Salzmann, A simple and mild chemical oxidation route to high-purity nano-graphene oxide, Carbon. 106 (2016) 56-63. doi:10.1016/j.carbon.2016.05.022.

[46] A. Sharma, A. Joshi, G. Verma, A. P. Toor, Surfactant assisted liquid phase exfoliation of graphene via probe tip sonication, (2015). doi:10.1063/1.4929263.

[47] M. Lotya, Y. Hernandez, P. J. King, R. J. Smith, V. Nicolosi, L. S. Karlsson, et al., Liquid Phase Production of Graphene by Exfoliation of Graphite in Surfactant/Water Solutions, Journal of the American Chemical Society. 131 (2009) 3611-3620. doi:10.1021/ja807449u

[48] Y. Hernandez, V. Nicolosi, M. Lotya, F. M. Blighe, Z. Sun, S. De, et al., High-yield production of graphene by liquid-phase exfoliation of graphite, Nature Nanotechnology. 3 (2008) 563-568. doi:10.1038/nnano.2008.215.

[49] U. Khan, A. Oneill, M. Lotya, S. De, J. N. Coleman, High-Concentration Solvent Exfoliation of Graphene, Small. 6 (2010) 864-871. doi:10.1002/smll.200902066.

[50] J. N. Coleman, Liquid-Phase Exfoliation of Nanotubes and Graphene, Advanced Functional Materials. 19 (2009) 3680-3695. doi:10.1002/adfm.200901640.

[51] Graphene via Molecule-Assisted Ultrasound-Induced Liquid-Phase Exfoliation: A Supramolecular Approach, Nano Online. (2018). doi:10.1515/nano.0075.00006.

[53] A. Celzard, J. Marêché, F. Payot, G. Furdin, Electrical conductivity of carbonaceous powders, Carbon. 40 (2002) 2801-2815. doi:10.1016/s0008-6223(02)00196-3.

[54] N. Zaaba, K. Foo, U. Hashim, S. Tan, W.-W. Liu, C. Voon, Synthesis of Graphene Oxide using Modified Hummers Method: Solvent Influence, Procedia Engineering. 184 (2017) 469-477. doi:10.1016/j.proeng.2017.04.118

[55] R. Fang, Y. Liang, X. Ge, M. Du, S. Li, T. Li, et al., Preparation and photocatalytic degradation activity of TiO2/rGO/polymer composites, Colloid and Polymer Science. 293 (2015) 1151-1157. doi:10.1007/s00396-015-3507-x.

[56] M. Acik, C. Mattevi, C. Gong, G. Lee, K. Cho, M. Chhowalla, et al., The Role of Intercalated Water in Multilayered Graphene Oxide, ACS Nano. 4 (2010) 5861-5868. doi:10.1021/nn101844t.

[57] S. Zhou, S. Kim, E. D. Gennaro, Y. Hu, C. Gong, X. Lu, et al., Film Structure of Epitaxial Graphene Oxide on SiC: Insight on the Relationship Between Interlayer Spacing, Water Content, and Intralayer Structure, Advanced Materials Interfaces. 1 (2014) 1300106. doi:10.1002/admi.201300106.

[58] S. Park, J. An, R. D. Piner, I. Jung, D. Yang, A. Velamakanni, et al., Aqueous Suspension and Characterization of Chemically Modified Graphene Sheets, Chemistry of Materials. 20 (2008) 6592-6594. doi:10.1021/cm801932u.

[59] J. Lee, K. Kim, W. I. Park, B.-H. Kim, J.H. Park, T.-H. Kim, et al., Uniform Graphene Quantum Dots Patterned from Self-Assembled Silica Nanodots, Nano Letters. 12 (2012) 6078-6083. doi:10.1021/nl302520m.

[60] N. R. Wilson, P. A. Pandey, R. Beanland, R. J. Young, I. A. Kinloch, L. Gong, et al., Graphene Oxide: Structural Analysis and Application as a Highly Transparent Support for Electron Microscopy, ACS Nano. 3 (2009) 2547-2556. doi:10.1021/nn900694t.

[61] Q. Mei, K. Zhang, G. Guan, B. Liu, S. Wang, Z. Zhang, Highly efficient photoluminescent graphene oxide with tunable surface properties, Chemical Communications. 46 (2010) 7319. doi:10.1039/c0cc02374d.

[62] T. F. Emiru, D. W. Ayele, Controlled synthesis, characterization and reduction of graphene oxide: A convenient method for large scale production, Egyptian Journal of Basic and Applied Sciences. 4 (2017) 74-79. doi:10.1016/j.ejbas.2016.11.002.

[63] H.-K. Jeong, Y. P. Lee, R. J. W. E. Lahaye, M.-H. Park, K. H. An, I. J. Kim, et al., Evidence of Graphitic AB Stacking Order of Graphite Oxides, Journal of the American Chemical Society. 130 (2008) 1362-1366. doi:10.1021/ja076473o.

[64] M. A. Pimenta, G. Dresselhaus, M. S. Dresselhaus, L. G. Cancado, A. Jorio, R. Saito, Studying disorder in graphite-based systems by Raman spectroscopy, Phys. Chem. Chem. Phys. 9 (2007) 1276-1290. doi:10.1039/b613962k.

[65] S. Claramunt, A. Varea, D. López-Díaz, M. M. Velazquez, A. Cornet, A. Cirera, The Importance of Interbands on the Interpretation of the Raman Spectrum of Graphene Oxide, The Journal of Physical Chemistry C. 119 (2015) 10123-10129. doi:10.1021/acs.jpcc.5b01590.

[66] J.-B. Wu, M.-L. Lin, X. Cong, H.-N. Liu, P.-H. Tan, Raman spectroscopy of graphene-based materials and its applications in related devices, Chemical Society Reviews. 47 (2018) 1822-1873. doi:10.1039/c6cs00915h.

[67] M. Lucchese, F. Stavale, E. M. Ferreira, C. Vilani, M. Moutinho, R. B. Capaz, et al., Quantifying ion-induced defects and Raman relaxation length in graphene, Carbon. 48 (2010) 1592-1597. doi:10.1016/j.carbon.2009.12.057.

[68] A. C. Ferrari, J. Robertson, Interpretation of Raman spectra of disordered and amorphous carbon, Physical Review B. 61 (2000) 14095-14107. doi:10.1103/physrevb.61.14095.

[69] F. Tuinstra, J. L. Koenig, Raman Spectrum of Graphite, The Journal of Chemical Physics. 53 (1970) 1126-1130. doi:10.1063/1.1674108.

[70] H. Wahab, R. Haverkamp, J. Kim, J. Cadogan, H.-C. Mertins, S.-H. Choi, et al., The structural response of graphene on copper to surface- and interfacial-oxygen, Carbon. 110 (2016) 414-425. doi:10.1016/j.carbon.2016.09.028.

[71] L. Wang, J. Zhao, Y.-Y. Sun, S. B. Zhang, Characteristics of Raman spectra for graphene oxide from ab initio simulations, The Journal of Chemical Physics. 135 (2011) 184503. doi:10.1063/1.3658859.

[72] H. Wahab, G. Xu, C. Jansing, M. Gilbert, M. F. Tesch, J. Jin, et al., Signatures of different carbon bonds in graphene oxide from soft x-ray reflectometry, X-Ray Spectrometry. 44 (2015) 468-473. doi:10.1002/xrs.2653.

[73] A. K. Swain, D. Bahadur, Enhanced Stability of Reduced Graphene Oxide Colloid Using Cross-Linking Polymers, The Journal of Physical Chemistry C. 118 (2014) 9450-9457. doi:10.1021/jp500205n.

[74] S. Stankovich, D. A. Dikin, R. D. Piner, K. A. Kohlhaas, A. Kleinhammes, Y. Jia, et al., Synthesis of graphene-based nanosheets via chemical reduction of exfoliated graphite oxide, Carbon. 45 (2007) 1558-1565. doi:10.1016/j.carbon.2007.02.034.

[75] M. A. Worsley, T. T. Pham, A. Yan, S. J. Shin, J. R. I. Lee, M. Bagge-Hansen, et al., Synthesis and Characterization of Highly Crystalline Graphene Aerogels, ACS Nano. 8 (2014) 11013-11022. doi:10.1021/nn505335u

[76] H. Chen, C. Chen, Y. Liu, X. Zhao, N. Ananth, B. Zheng, et al., High-Quality Graphene Microflower Design for High-Performance Li—S and Al-Ion Batteries, Advanced Energy Materials. 7 (2017) 1700051. doi:10.1002/aenm.201700051.

[77] R. Liu, Y. Zhang, Z. Ning, Y. Xu, Rücktitelbild: A Catalytic Microwave Process for Superfast Preparation of High-Quality Reduced Graphene Oxide (Angew. Chem. 49/2017), Angewandte Chemie. 129 (2017) 15978-15978. doi:10.1002/ange.201711015.

[78] C. Casiraghi, S. Pisana, K. S. Novoselov, A. K. Geim, A. C. Ferrari, Raman fingerprint of charged impurities in graphene, Applied Physics Letters. 91 (2007) 233108. doi:10.1063/1.2818692.

[79] B. Ma, R. D. Rodriguez, A. Ruban, S. Pavlov, E. Sheremet, The correlation between electrical conductivity and second-order Raman modes of laser-reduced graphene oxide, Physical Chemistry Chemical Physics. 21 (2019) 10125-10134. doi:10.1039/c9cp00093c.

STATEMENTS REGARDING INCORPORATION BY REFERENCE AND VARIATIONS

All references throughout this application, for example patent documents including issued or granted patents or equivalents; patent application publications; and non-patent literature documents or other source material; are each hereby incorporated by reference herein in its entirety, as though individually incorporated by reference, to the extent each reference is at least partially not inconsistent with the disclosure in this application (for example, a reference that is partially inconsistent is incorporated by reference except for the partially inconsistent portion of the reference).

STATEMENTS REGARDING CHEMICAL COMPOUNDS AND NOMENCLATURE

In general, the terms and phrases used herein have their art-recognized meaning, which can be found by reference to standard texts, journal references and contexts known to those skilled in the art. The following definitions are provided to clarify their specific use in the context of the invention.

In an embodiment, a composition or compound of the invention, such as an alloy or precursor to an alloy, is isolated or substantially purified. In an embodiment, an isolated or purified compound is at least partially isolated or substantially purified as would be understood in the art. In an embodiment, a substantially purified composition, compound or formulation of the invention has a chemical purity of 95%, optionally for some applications 99%, optionally for some applications 99.9%, optionally for some applications 99.99%, and optionally for some applications 99.999% pure.

The terms and expressions which have been employed herein are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments, exemplary embodiments and optional features, modification and variation of the concepts herein disclosed may be resorted to by those skilled in the art, and that such modifications and variations are considered to be within the scope of this invention as defined by the appended claims. The specific embodiments provided herein are examples of useful embodiments of the present invention and it will be apparent to one skilled in the art that the present invention may be carried out using a large number of variations of the devices, device components, methods steps set forth in the present description. As will be obvious to one of skill in the art, methods and devices useful for the present methods can include a large number of optional composition and processing elements and steps.

As used herein and in the appended claims, the singular forms "a", "an", and "the" include plural reference unless the context clearly dictates otherwise. Thus, for example, reference to "a cell" includes a plurality of such cells and equivalents thereof known to those skilled in the art. As well, the terms "a" (or "an"), "one or more" and "at least one" can be used interchangeably herein. It is also to be noted that the terms "comprising", "including", and "having" can be used interchangeably. The expression "of any of claims XX-YY" (wherein XX and YY refer to claim numbers) is intended to provide a multiple dependent claim in the alternative form, and in some embodiments is interchangeable with the expression "as in any one of claims XX-YY."

When a group of substituents is disclosed herein, it is understood that all individual members of that group and all subgroups, including any isomers, enantiomers, and diastereomers of the group members, are disclosed separately. When a Markush group or other grouping is used herein, all individual members of the group and all combinations and subcombinations possible of the group are intended to be individually included in the disclosure. When a compound is described herein such that a particular isomer, enantiomer or diastereomer of the compound is not specified, for example, in a formula or in a chemical name, that description is intended to include each isomers and enantiomer of the compound described individual or in any combination. Additionally, unless otherwise specified, all isotopic variants of compounds disclosed herein are intended to be encompassed by the disclosure. For example, it will be understood that any one or more hydrogens in a molecule disclosed can be replaced with deuterium or tritium. Isotopic variants of a molecule are generally useful as standards in assays for the molecule and in chemical and biological research related to the molecule or its use. Methods for making such isotopic variants are known in the art. Specific names of compounds are intended to be exemplary, as it is known that one of ordinary skill in the art can name the same compounds differently.

Certain molecules disclosed herein may contain one or more ionizable groups [groups from which a proton can be removed (e.g., —COOH) or added (e.g., amines) or which can be quaternized (e.g., amines)]. All possible ionic forms of such molecules and salts thereof are intended to be included individually in the disclosure herein. With regard to salts of the compounds herein, one of ordinary skill in the art can select from among a wide variety of available counterions those that are appropriate for preparation of salts of this invention for a given application. In specific applications, the selection of a given anion or cation for preparation of a salt may result in increased or decreased solubility of that salt.

Every device, system, formulation, combination of components, or method described or exemplified herein can be used to practice the invention, unless otherwise stated.

Whenever a range is given in the specification, for example, a temperature range, a time range, or a composition or concentration range, all intermediate ranges and subranges, as well as all individual values included in the ranges given are intended to be included in the disclosure. It will be understood that any subranges or individual values in a range or subrange that are included in the description herein can be excluded from the claims herein.

All patents and publications mentioned in the specification are indicative of the levels of skill of those skilled in the art to which the invention pertains. References cited herein are incorporated by reference herein in their entirety to indicate the state of the art as of their publication or filing date and it is intended that this information can be employed herein, if needed, to exclude specific embodiments that are in the prior art. For example, when composition of matter are claimed, it should be understood that compounds known and available in the art prior to Applicant's invention, including compounds for which an enabling disclosure is provided in the references cited herein, are not intended to be included in the composition of matter claims herein.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. In each instance herein any of the terms "comprising", "consisting essentially of" and "consisting of" may be replaced with either of the other two terms. The invention illustratively described herein suitably may be practiced in the absence of any element or elements, limitation or limitations which is not specifically disclosed herein.

One of ordinary skill in the art will appreciate that starting materials, reagents, synthetic methods, purification methods, analytical methods, assay methods, and instrumental methods other than those specifically exemplified can be employed in the practice of the invention without resort to undue experimentation. All art-known functional equivalents, of any such materials and methods are intended to be included in this invention. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

We claim:

1. A method of producing a graphene oxide product, the method comprising:
   contacting a carbon-containing feedstock with an oxidizing composition comprising aqueous nitric acid to from a reactant slurry wherein the concentration of nitric acid is 50 to 63 wt % in the reactant slurry;
   controlling the temperature of the reactant slurry during the contacting step to a temperature between 50 and 90° C.;
   in response to the contacting step, oxidizing the carbon-containing feedstock of the reactant slurry to form a graphite oxide slurry; and
   processing the graphite oxide slurry into a graphene oxide product.

2. The method of claim 1, wherein the carbon-containing feedstock is charred biomass, biochar, coal, coal char, dimethylformamide (DMF) extracted coal residue, coal EL, or coke or combinations thereof.

3. The method of claim 1, comprising charring the carbon-containing feedstock.

4. The method of claim 3, comprising grinding the carbon-containing feedstock.

5. The method of claim 1, comprising separating the carbon-containing feedstock to remove particles larger than 200 μm and smaller than 2 μm.

6. The method of claim 5, wherein the separating step comprises separating the carbon-containing feedstock to remove particles larger than 150 μm.

7. The method of claim 5, wherein the separating step comprises separating the carbon-containing feedstock to remove particles larger than 100 μm.

8. The method of claim 5, wherein the separating step comprises mechanically separating the carbon-containing feedstock to remove particles larger than 80 μm.

9. The method of claim 5, wherein the separating step comprises mechanically separating the carbon-containing feedstock to remove particles larger than 50 μm.

10. The method of claim 5, wherein the separating step comprises mechanically separating the carbon-containing feedstock to remove particles larger than 20 μm.

11. The method of claim 1, wherein the oxidizing composition comprises 50 to 62 wt. % nitric acid.

12. The method of claim 1, wherein the oxidizing composition comprises 52 to 61 wt. % nitric acid.

13. The method of claim 1, wherein the oxidizing composition comprises 54 to 60 wt. % nitric acid.

14. The method of claim 1, wherein the oxidizing composition comprises 56 to 60 wt. % nitric acid.

15. The method of claim 1, wherein nitric acid is the only oxidizing agent in the oxidizing composition.

16. The method of claim 1, wherein the oxidizing composition is essentially free of sulfuric acid.

17. The method of claim 1, wherein the oxidizing composition is essentially free of sulfuric acid, sodium nitrate, potassium permanganate and phosphoric acid.

18. The method of claim 1, comprising controlling the temperature of the reactant slurry during the contacting step to a temperature between 60 and 80° C.

19. The method of claim 1, comprising controlling the temperature of the reactant slurry during the contacting step to a temperature between 65 and 75° C.

20. The method of claim 1, wherein the step of processing the graphite oxide slurry into a graphene oxide product comprises:
   sonicating the graphite oxide slurry to form a graphene oxide slurry.

21. The method of claim 1, wherein the step of processing the graphite oxide slurry into a graphene oxide product comprises:
   filtering graphene oxide solids; and
   lyophilizing the graphene oxide solids.

22. The method of claim 1 wherein the step of processing the graphite oxide slurry into a graphene oxide product comprises:
   annealing graphene oxide solids.

23. The method of claim 22, wherein the annealing step comprises heating the graphene oxide solids to a temperature of 150 to 400° C.

24. The method of claim 22, wherein the annealing step comprises heating the graphene oxide solids to a temperature of 175 to 325° C.

25. The method of claim 22, wherein the annealing step comprises heating the graphene oxide solids to a temperature of 200 to 300° C.

26. The method of claim 22, wherein the annealing step comprises heating the graphene oxide solids to a temperature of 225 to 275° C.

27. The method of claim 22, comprising controlling the rate of heating during the annealing step.

28. The method of claim 27, comprising controlling the rate of heating during the annealing step to 0.1 to 1° C. per minute.

29. The method of claim 27, comprising controlling the rate of heating during the annealing step to not greater than 0.2° C. per minute.

30. The method of claim 27, comprising controlling the rate of heating during the annealing step to at least 0.4° C. per minute.

* * * * *